(12) United States Patent
Wang et al.

(10) Patent No.: US 10,868,652 B2
(45) Date of Patent: *Dec. 15, 2020

(54) TECHNIQUES AND APPARATUSES FOR COMMON UPLINK BURST

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Peter Gaal, San Diego, CA (US); Wei Zeng, Saratoga, CA (US); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,401

(22) Filed: Mar. 8, 2019

(65) Prior Publication Data
US 2019/0207724 A1 Jul. 4, 2019

Related U.S. Application Data

(63) Continuation of application No. PCT/US2017/048619, filed on Aug. 25, 2017, which
(Continued)

(51) Int. Cl.
*H04W 4/00* (2018.01)
*H04L 5/00* (2006.01)
(Continued)

(52) U.S. Cl.
CPC ............ *H04L 5/005* (2013.01); *H04L 5/0044* (2013.01); *H04L 5/0051* (2013.01);
(Continued)

(58) Field of Classification Search
None
See application file for complete search history.

(56) References Cited

U.S. PATENT DOCUMENTS 8,503,425 B2 8/2013 Chung et al.
8,855,073 B2 10/2014 Han et al.
(Continued)

FOREIGN PATENT DOCUMENTS

JP 2018536355 A 12/2018
JP 2019500790 A 1/2019
(Continued)

OTHER PUBLICATIONS

Ericsson: "Summary of E-Mail Discussions on Uplink Control Signaling," 3GPP TSG-RAN WG1#87 R1-1613162; Nov. 19, 2016 (Nov. 19, 2016), 24 pages, URL: http://www.3gpp.org/ftp/tsg_ran/WG1_RL1/TSGR1_87/Docs/R1-1613162.zip.
(Continued)

*Primary Examiner* — Clemence S Han
(74) *Attorney, Agent, or Firm* — Qualcomm Incorporated

(57) ABSTRACT

Certain aspects of the present disclosure generally relate to wireless communications. In some aspects, a wireless communication device may configure a wireless communication structure to include at least a data portion and a common uplink portion, wherein the common uplink portion includes a first symbol and a second symbol, wherein the first symbol precedes the second symbol. The wireless communication device may map at least a portion of one or more reference signals or an uplink payload to at least one of the first symbol or the second symbol.

36 Claims, 14 Drawing Sheets

US 10,868,652 B2
Page 2

Related U.S. Application Data is a continuation of application No. 15/685,778, filed on Aug. 24, 2017, now Pat. No. 10,142,074.

(60) Provisional application No. 62/417,106, filed on Nov. 3, 2016.

(51) Int. Cl.
*H04L 27/26* (2006.01)
*H04W 72/04* (2009.01)
*H04W 28/02* (2009.01)

(52) U.S. Cl.
CPC ........ *H04L 5/0053* (2013.01); *H04L 27/2613* (2013.01); *H04W 72/0446* (2013.01); *H04L 5/001* (2013.01); *H04L 5/0007* (2013.01); *H04L 5/0048* (2013.01); *H04L 5/0055* (2013.01); *H04L 5/0057* (2013.01); *H04W 28/0278* (2013.01); *H04W 72/0413* (2013.01)

(56) References Cited

U.S. PATENT DOCUMENTS

| | | | |
|---|---|---|---|
| 9,113,456 | B2 | 8/2015 | Cheon et al. |
| 9,949,275 | B2 | 4/2018 | Chen et al. |
| 10,142,074 | B2* | 11/2018 | Wang .................... H04L 5/0051 |
| 2011/0205981 | A1 | 8/2011 | Koo et al. |
| 2014/0003369 | A1 | 1/2014 | Josiam et al. |
| 2016/0081084 | A1* | 3/2016 | Blankenship ........... H04W 4/70 370/329 |
| 2016/0212765 | A1 | 7/2016 | Talukdar et al. |
| 2016/0360518 | A1* | 12/2016 | Noh .................... H04L 27/2607 |
| 2017/0135091 | A1* | 5/2017 | Han ...................... H04W 24/10 |
| 2017/0142702 | A1 | 5/2017 | Yu et al. |
| 2017/0163388 | A1* | 6/2017 | Wiemann .............. H04L 1/1851 |
| 2017/0164352 | A1* | 6/2017 | Yang .................... H04L 5/0053 |
| 2017/0215206 | A1* | 7/2017 | Cheng ............... H04W 74/0816 |
| 2017/0230972 | A1* | 8/2017 | Wang ................ H04W 72/0446 |
| 2017/0245302 | A1* | 8/2017 | Mukherjee ........ H04W 74/0808 |
| 2017/0251464 | A1* | 8/2017 | Mukherjee ........... H04W 16/14 |
| 2018/0063858 | A1* | 3/2018 | Au ...................... H04L 27/2602 |

FOREIGN PATENT DOCUMENTS

| | | |
|---|---|---|
| JP | 2019501565 A | 1/2019 |
| WO | 2015050743 A1 | 4/2015 |
| WO | WO-2017052688 A1 | 3/2017 |
| WO | WO-2017095553 A1 | 6/2017 |
| WO | WO-2017100100 A1 | 6/2017 |
| WO | WO-2017100101 A1 | 6/2017 |
| WO | WO-2017111988 A1 | 6/2017 |

OTHER PUBLICATIONS

Qualcomm Incorporated: "User Multiplexing of DFTs-OFDM and OFDM in Uplink", 3GPP DRAFT; R1-1610114, 3GPP TSG-RAN WG1#86b, User Multiplexing of DFTs-OFDM and OFDM in Uplink, 3rd Generation Partnership Project (3GPP), Mobile Competence Centre; 650, Route Des Lucioles; F-06921 Sophia-Antipolis Cedex France, vol. RAN WG1, No. Lisbon, Portugal; Oct. 10, 2016-Oct. 14, 2016 Oct. 9, 2016 (Oct. 9, 2016), XP051150138, Retrieved from the Internet: URL:http://www.3gpp.org/ftp/tsg_ran/WG1_RL1/TSGR1_86b/Docs/R1-1610114.
Taiwan Search Report—TW106129127—TIPO—dated Aug. 14, 2019.
Huawei et al., "Discussion on Time Domain Structures", 3GPP Draft, 3GPP TSG RAN WG1 Meeting #86, R1-166104, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 22, 2016-Aug. 26, 2016, Aug. 21, 2016 (Aug. 21, 2016), 6 Pages, XP051125215, Retrieved from the Internet: URL: http://www.3gpp.org/ftp/Meetings_3GPP_SYNC/RAN1/Docs/ [retrieved on Aug. 21, 2016], Section 2.3.
LG Electronics: "On multiplexing between eMBB and URLLC", 3GPP TSG RAN WG1 Meeting #86bis, R1-1609236, Lisbon, Portugal, Oct. 10-14, 2016, pp. 1-12.
Ericsson, "5G-Key Component of the Networked Society," 3GPP RAN Workshop on 5G, RWS-150009, Phoenix, AZ, USA, Sep. 17-18, 2015,55 pgs., XP051043759, 3rd Generation D Partnership Project, Sophia-Antipolis Cedex, France.
Huawei et al., "Discussion on Downlink Control Channel Design", 3GPP Draft; R1-1609432, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 9, 2016, XP051149475, Retrieved from the Internet: URL:http://www.3gpp.org/ftp/Meetings_3GPP_SYNC/RAN1/Docs/ [retrieved on Oct. 9, 2016], 5 pages.
Huawei et al., "Overview of Frame Structure for NR", 3GPP Draft; R1-166102, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, XP051140062, Retrieved from the Internet: URL:http://www.3gpp.org/ftp/Meetings_3GPP_SYNC/RAN1/Docs/ [retrieved on Aug. 21, 2016], 8 pages.
International Search Report and Written Opinion—PCT/US2017/048619—ISA/EPO—dated Nov. 14, 2017.
QUALCOMM Incorporated: "Advanced Frame Structure", 3GPP Draft; R1-1610132, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 1, 2016, XP051159935, Retrieved from the Internet: URL:http://www.3gpp.org/ftp/tsg_ran/WG1_RL1/TSGR1_86b/Docs [retrieved on Oct. 1, 2016], 9 pages.
QUALCOMM Incorporated: "Candidate Frame Structures", 3GPP Draft; R1-164695, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016, XP051089940, Retrieved from the Internet: URL:http://www.3gpp.org/ftp/tsg_ran/WG1_RL1/TSGR1_85/Docs/ [retrieved on May 14, 2016], 8 pages.
QUALCOMM Incorporated: "Channelization of 2-Symbol Short PUCCH", 3GPP Draft; R1-1708618, 3rd Generation Partnership Project (3GPP), Mobile Competence Centre; 650, Route Des Lucioles; F-06921 Sophia-Antipolis Cedex; France, vol. RAN WG1, No. Hangzhou, China; May 14, 2017, XP051273807, Retrieved from the Internet: URL:http://www.3gpp.org/ftp/Meetings_3GPP_SYNC/RAN1/Docs/ [retrieved on May 14, 2017], 5 pages.
QUALCOMM Incorporated: "On UCI Aspects", 3GPP Draft; R1-1708648, 3rd Generation Partnership Project (3GPP), Mobile Competence Centre; 650, Route Des Lucioles; F-06921 Sophia-Antipolis Cedex; France, vol. RAN WG1, No. Hangzhou, May 14, 2017, XP051273835, Retrieved from the Internet: URL:http://www.3gpp.org/ftp/Meetings_3GPP_SYNC/RAN1/Docs/ [retrieved on May 14, 2017], 4 pages.
QUALCOMM Incorporated: "UL Channelization in Short UL Duration", 3GPP Draft; R1-1612073, 3rd Generation Partnership Project (3GPP), Mobile Competence Centre; 650, Route Des Lucioles; F-06921 Sophia-Antipolis Cedex; France, vol. RAN WG1, No. Reno, U.S.A; Nov. 5, 2016, XP051190671, Retrieved from the Internet: URL:http://www.3gpp.org/ftp/tsg_ran/WG1_RL1/TSGR1_87/Docs/ [retrieved on Nov. 5, 2016], 8 pages.
QUALCOMM Incorporated: "UL Waveform Configuration", 3GPP Draft; R1-1612075, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 13, 2016, XP051176035, Retrieved from the Internet: URL:http://www.3gpp.org/ftp/Meetings_3GPP_SYNC/RAN1/Docs/ [retrieved on Nov. 13, 2016], 6 pages.

* cited by examiner

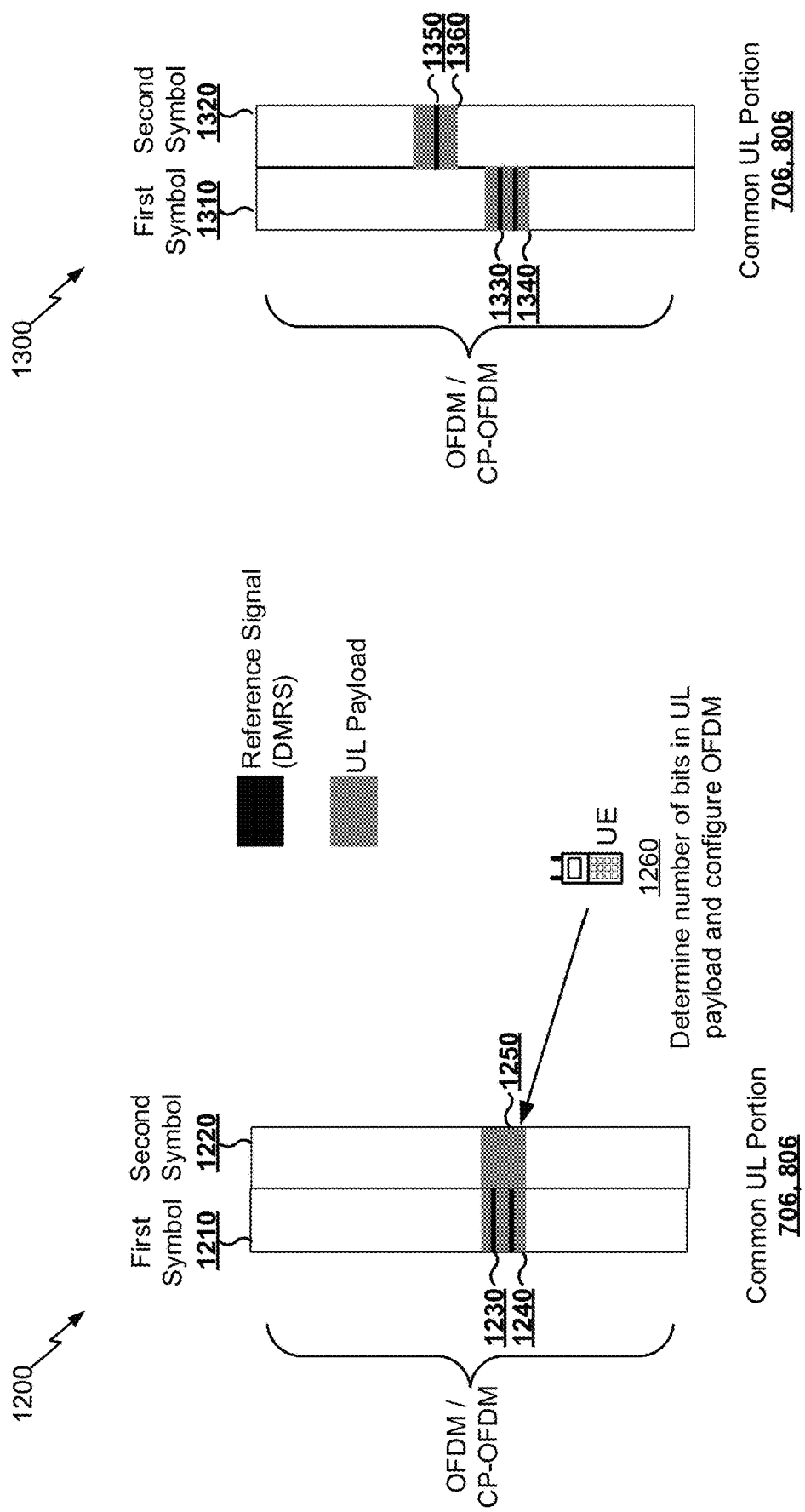

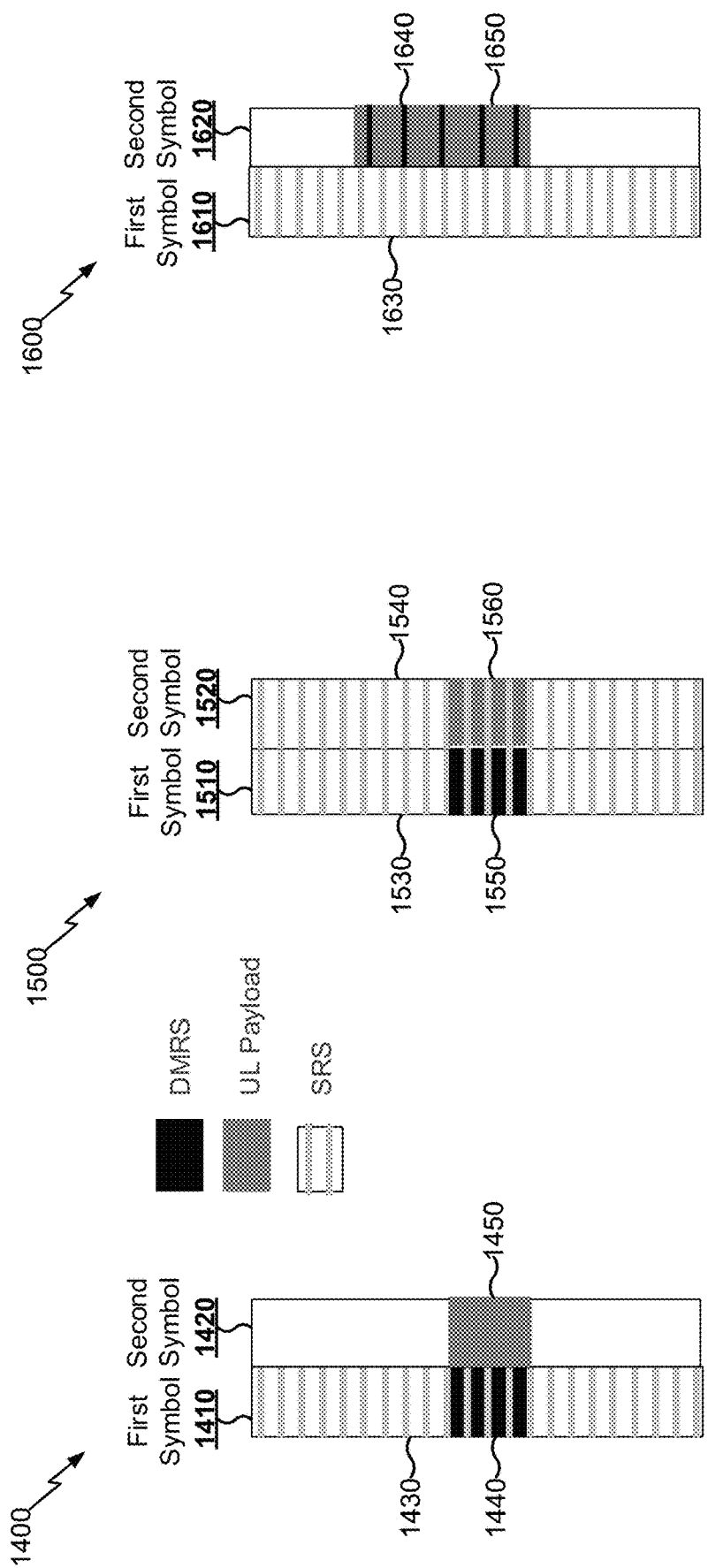

TECHNIQUES AND APPARATUSES FOR COMMON UPLINK BURST

CROSS-REFERENCE TO RELATED APPLICATIONS UNDER 35 U.S.C. § 119

This application is a continuation of International Application No. PCT/US2017/048619, filed Aug. 25, 2017, entitled "TECHNIQUES AND APPARATUSES FOR COMMON UPLINK BURST," which is a continuation of U.S. patent application Ser. No. 15/685,778 (now U.S. Pat. No. 10,142,074), filed Aug. 24, 2017, entitled "TECHNIQUES AND APPARATUSES FOR COMMON UPLINK BURST," which claims priority to U.S. Provisional Patent Application No. 62/417,106, filed on Nov. 3, 2016, entitled "TECHNIQUES AND APPARATUSES FOR COMMON UPLINK BURST IN NEW RADIO," which are hereby expressly incorporated by reference herein.

FIELD OF THE DISCLOSURE

Aspects of the present disclosure generally relate to wireless communications, and more particularly to techniques and apparatuses for common uplink burst.

BACKGROUND

Wireless communications systems are widely deployed to provide various telecommunication services such as telephony, video, data, messaging, and broadcasts. Typical wireless communications systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communications network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio, is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some aspects, a method for wireless communication may include configuring, by a wireless communication device, a wireless communication structure to include at least a data portion and a common uplink portion, wherein the common uplink portion includes a first symbol and a second symbol, wherein the first symbol precedes the second symbol. The method may include mapping, by the wireless communication device, at least a portion of one or more reference signals or an uplink payload to at least one of the first symbol or the second symbol. In aspects, configuring the wireless communication structure may include at least defining a transmission unit in the time domain.

In some aspects, a wireless communication device may include a memory and one or more processors operatively coupled to the memory. The one or more processors may be configured to configure a wireless communication structure to include at least a data portion and a common uplink portion, wherein the common uplink portion includes a first symbol and a second symbol, wherein the first symbol precedes the second symbol. The one or more processors may be configured to map at least a portion of one or more reference signals or an uplink payload to at least one of the first symbol or the second symbol.

In some aspects, a non-transitory computer-readable medium may store one or more instructions for wireless communication. The one or more instructions, when executed by one or more processors of a wireless communication device, may cause the one or more processors to configure a wireless communication structure to include at least a data portion and a common uplink portion, wherein the common uplink portion includes a first symbol and a second symbol, wherein the first symbol precedes the second symbol. The one or more instructions may cause the one or more processors to map at least a portion of one or more reference signals or an uplink payload to at least one of the first symbol or the second symbol.

In some aspects, an apparatus for wireless communication may include means for configuring a wireless communication structure to include at least a data portion and a common uplink portion, wherein the common uplink portion includes a first symbol and a second symbol, wherein the first symbol precedes the second symbol. The apparatus may include means for mapping at least a portion of one or more reference signals or an uplink payload to at least one of the first symbol or the second symbol.

Aspects generally include a method, apparatus, system, computer program product, non-transitory computer-readable medium, user equipment, wireless communications device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9-16 are diagrams illustrating examples of techniques for common uplink burst, in accordance with various aspects of the present disclosure.

DETAILED DESCRIPTION

Figure 1:
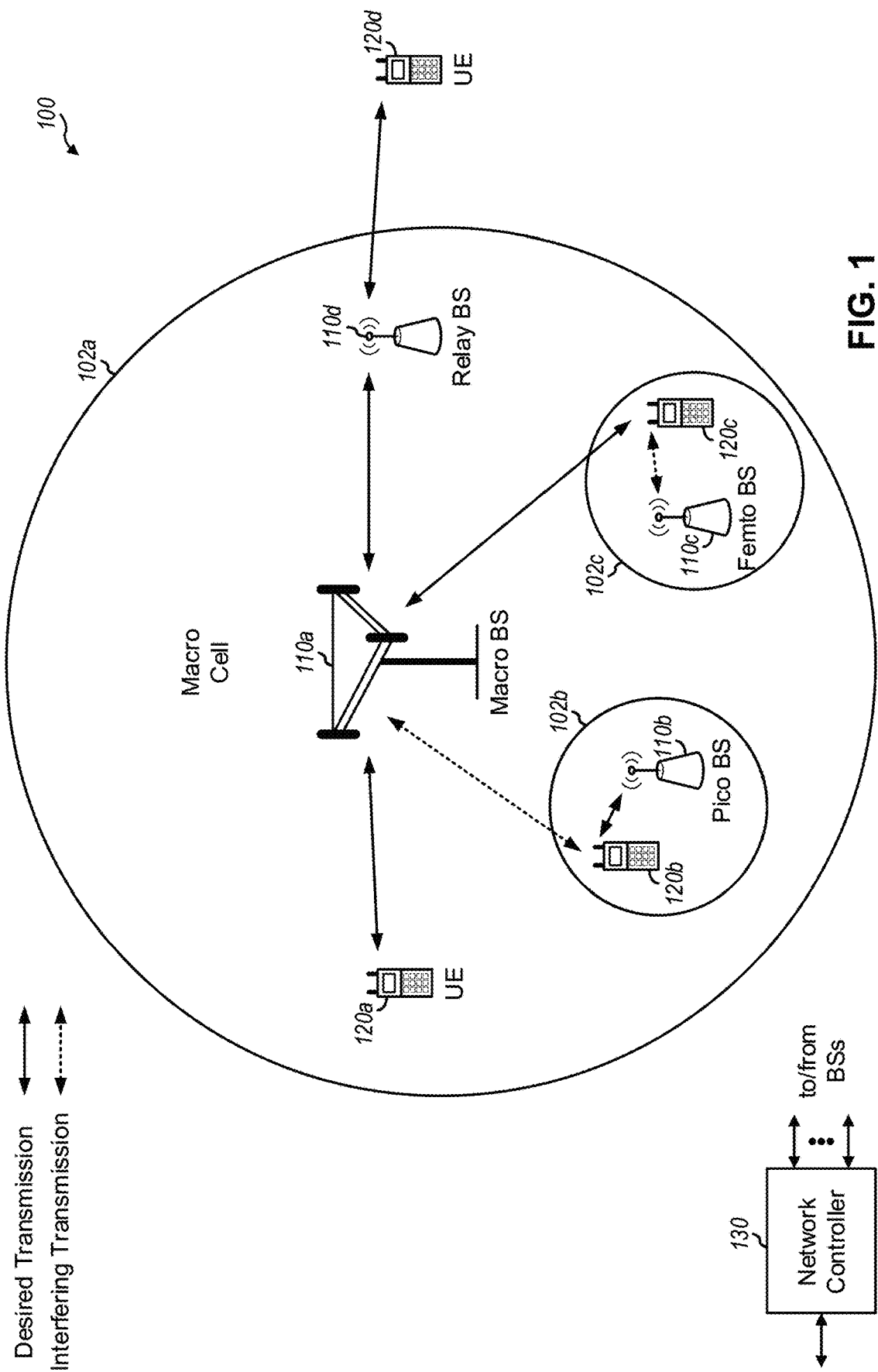
FIG. 1 is a block diagram conceptually illustrating an example of a wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communications link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communications. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
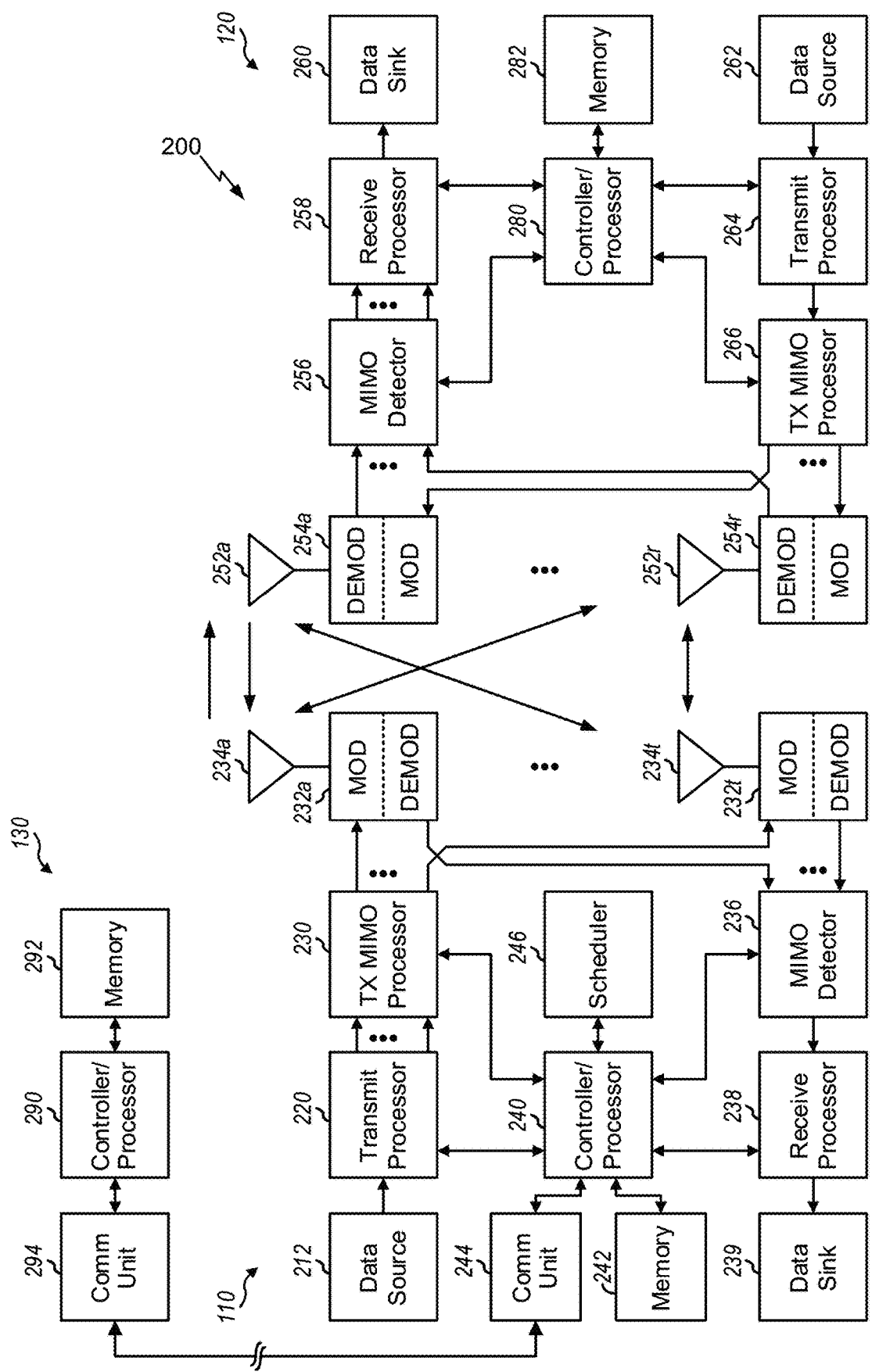
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform techniques for common uplink burst, as described in more detail elsewhere herein. For example, controller/processor 280 and/or other processors and modules at UE 120, may perform or direct operations of UE 120 to perform techniques for common uplink burst, as described in more detail elsewhere herein. For example, controller/processor 280 and/or other controllers/processors and modules at UE 120 may perform or direct operations of, for example, process 1700 of FIG. 17, and/or other processes as described herein. In some aspects, one or more of the components shown in FIG. 2 may be employed to perform example process 1700, and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
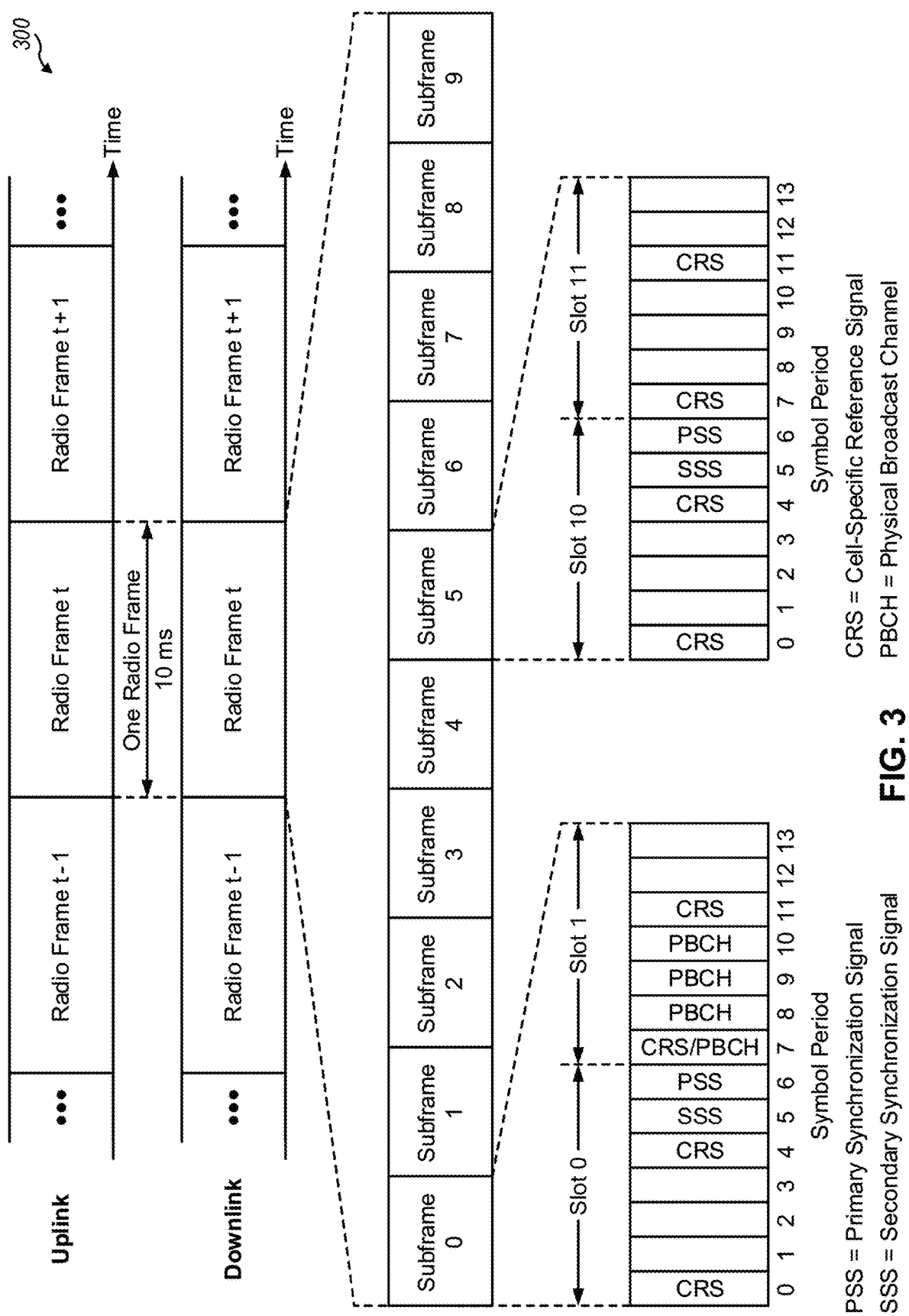
FIG. 3 is a block diagram conceptually illustrating an example of a frame structure in a wireless communications network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may be partitioned into subframes. Each subframe may include a number of slots. Each slot may include L symbol periods, e.g., seven symbol periods for a normal cyclic prefix (as shown in FIG. 3) or six symbol periods for an extended cyclic prefix.

While some aspects are described herein in connection with frames, subframes, slots, and/or the like, these aspects may equally apply to other types of wireless communication structures, which may be referred to using terms other than "frame," "subframe," "slot," and/or the like in 5G NR.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
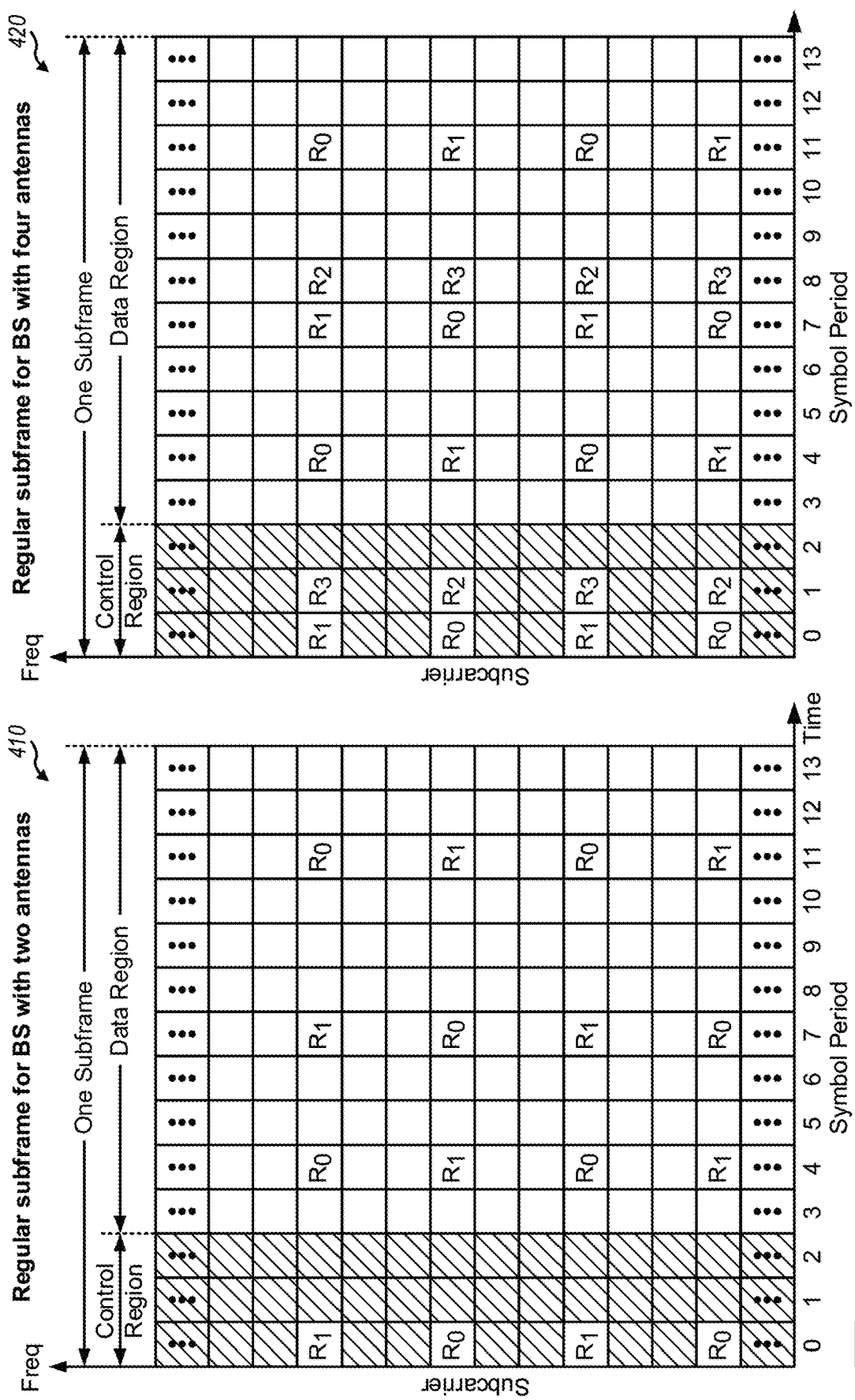
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. Subframe format 420 may be used with four antennas. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data). The PSS, SSS, CRS and PBCH in LTE are described in 3GPP TS 36.211, entitled "Evolved Universal Terrestrial Radio Access (E-UTRA); Physical Channels and Modulation," which is publicly available.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

While aspects of the examples described herein may be associated with LTE technologies, aspects of the present disclosure may be applicable with other wireless communications systems, such as 5G technologies. 5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for 5G may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

As indicated above, FIG. 4 is provided merely as an example. Other examples are possible and may differ from what was described with regard to FIG. 4.

Figure 5:
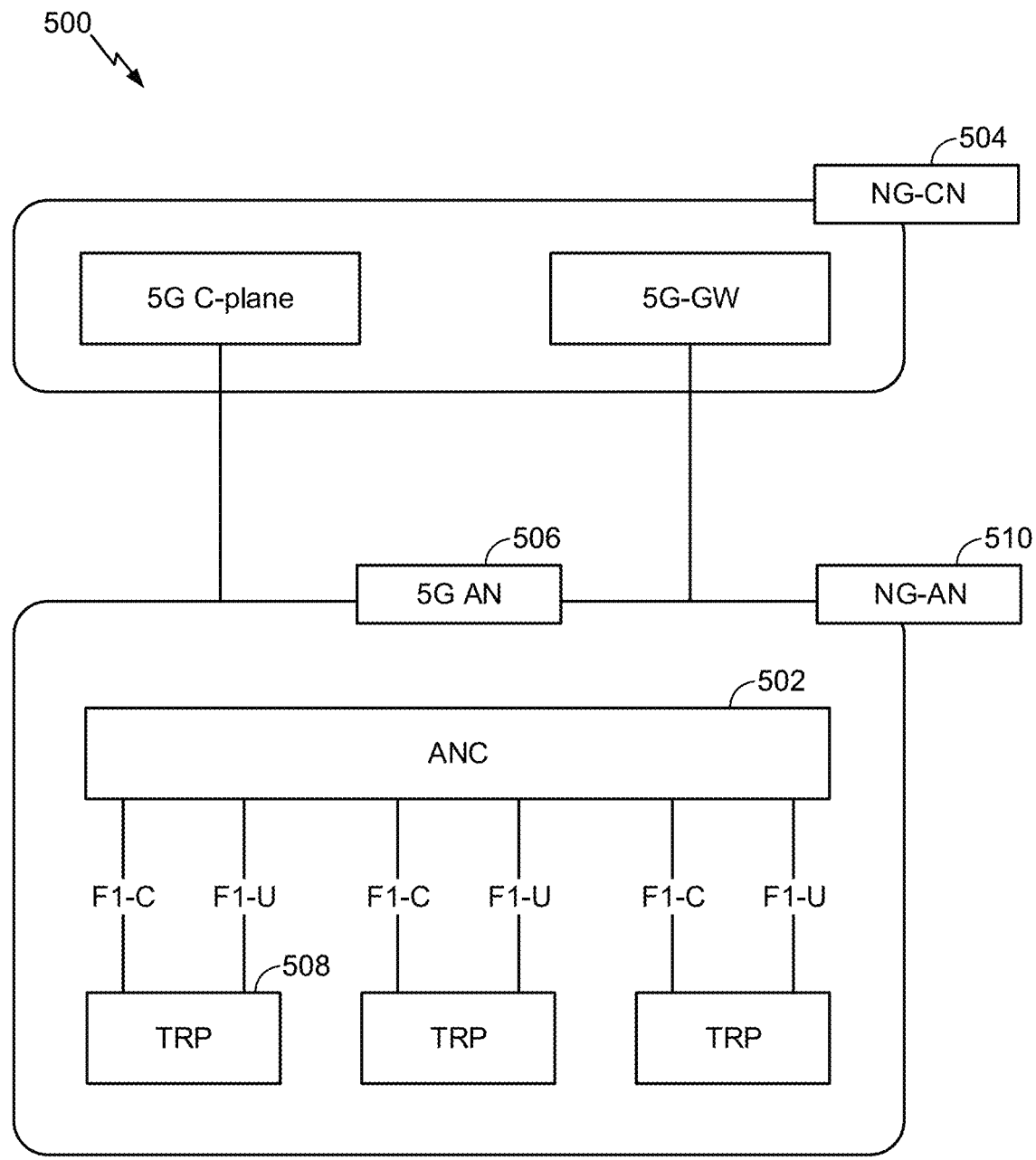
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, 5G BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
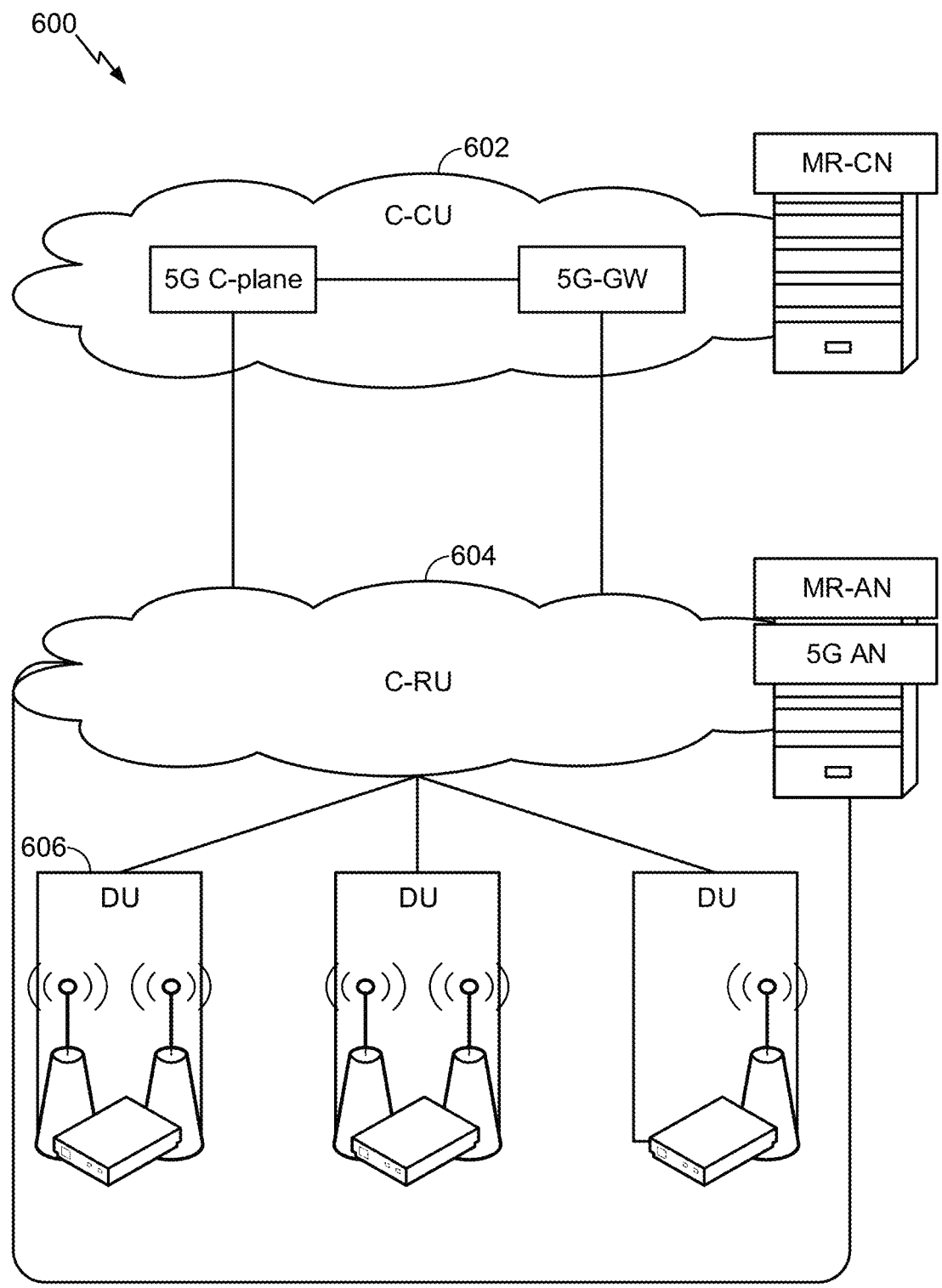
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
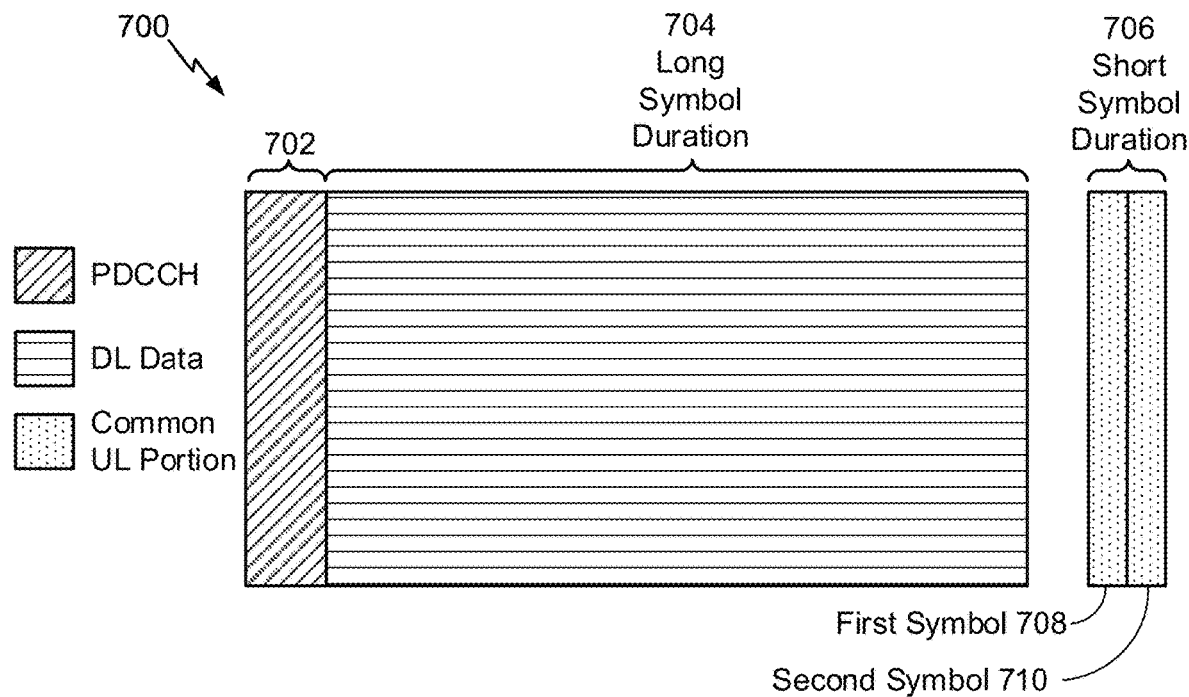
FIG. 7 is a diagram illustrating an example of a downlink (DL)-centric subframe or wireless communication structure, in accordance with certain aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, an UL burst portion, a common UL burst, a short burst, an UL short burst, a common UL short burst, a common UL short burst portion, and/or various other suitable terms. In some aspects, the common UL portion 706 may include one or more reference signals. Additionally, or alternatively, the common UL portion 706 may include feedback information corresponding to various other portions of the DL-centric subframe. For example, the common UL portion 706 may include feedback information corresponding to the control portion 702 and/or the data portion 704. Non-limiting examples of information that may be included in the common UL portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The common UL portion 706 may include additional or alternative information, such as information pertaining to random access channel (RACH) procedures, scheduling requests, and various other suitable types of information.

Techniques described herein relate to configuring a wireless communication structure (e.g., a subframe, such as a DL-centric subframe or an UL-centric subframe) to include at least a data portion 704 and a common uplink portion 706, wherein the common uplink portion includes a first symbol 708 and a second symbol 710. For example, a UE (e.g., UE 120) may configure the DL-centric subframe to include at least the data portion 704 and the common uplink portion 706, and may configure the common uplink portion 706 to include the first symbol 708 and the second symbol 710. The first symbol 708 may precede the second symbol 710. In some aspects, the first symbol 708 and the second symbol 710 may be configured to have a shorter symbol duration than one or more symbols included in another portion of the wireless communication structure, such as data portion 704. In some aspects, the first symbol 708 and the second symbol 710 may be configured with different symbol durations than one another. In some aspects, configuring the wireless communication structure may include at least defining a transmission unit in the time domain.

In some aspects, the UE may configure the common uplink portion 706 with a different (e.g., a larger) sub-carrier spacing than the data portion 704 to achieve a different (e.g., the shorter) symbol duration for the common uplink portion 706. For example, the data portion 704 may be configured with a sub-carrier spacing of 15 kHz, resulting in a symbol duration of 1/14 milliseconds, and the common uplink portion 706 may be configured with a sub-carrier spacing of 30 kHz, resulting in a symbol duration of 1/28 millisecond. In this way, the UE may create additional processing time (e.g., of 1/28 millisecond) for uplink payload data to be transmitted using the second symbol 710, as described in more detail elsewhere herein. In some aspects, the first symbol 708 and the second symbol 710 may be configured with different a sub-carrier spacing from one another, resulting in different symbol durations for the first symbol 708 and the second symbol 710.

As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure and alternative structures having similar features may exist without necessarily deviating from the aspects described herein.

As indicated above, FIG. 7 is provided merely as an example. Other examples are possible and may differ from what was described with regard to FIG. 7.

Figure 8:
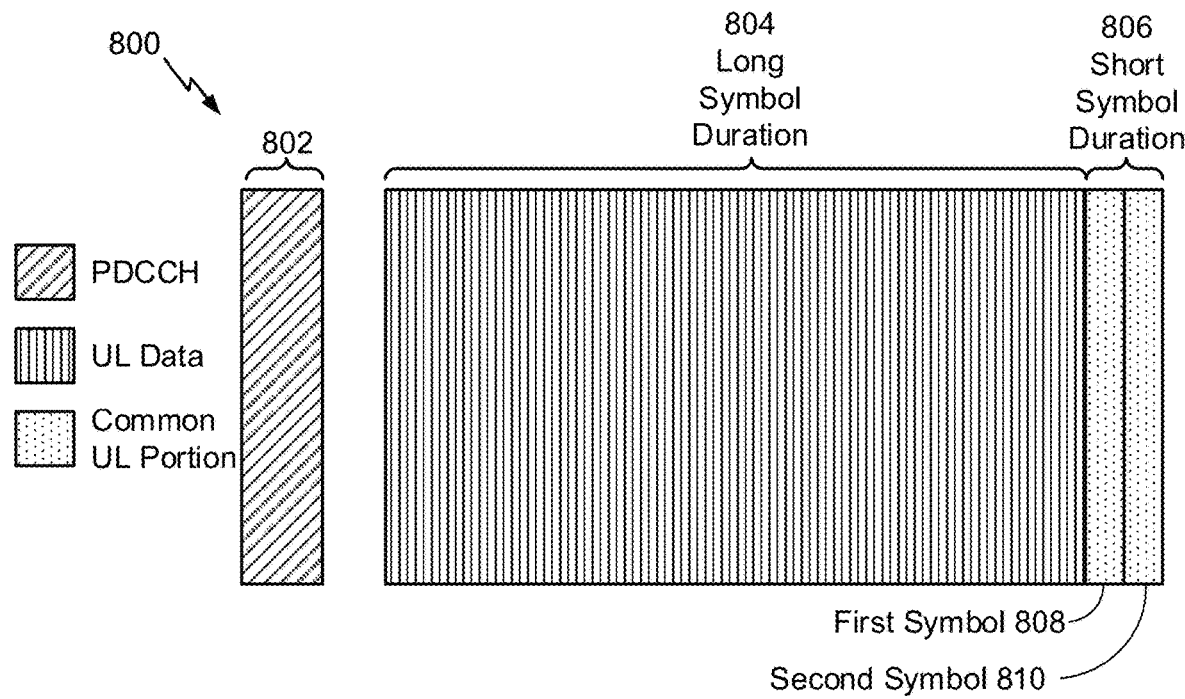
FIG. 8 is a diagram illustrating an example of an uplink (UL)-centric subframe or wireless communication structure, in accordance with certain aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 802 described above with reference to FIG. 8. In some configurations, the control portion 802 may be a physical DL control channel (PDCCH).

The UL-centric subframe may also include an UL data portion 804. The UL data portion 804 may sometimes be referred to as the payload of the UL-centric subframe. The UL data portion 804 may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include a common UL portion 806. The common UL portion 806 in FIG. 8 may be similar to the common UL portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In a similar manner as described above in connection with FIG. 7, a UE (e.g., UE 120) may configure a wireless communication structure to include at least a data portion 804 and a common uplink portion 806, wherein the common uplink portion includes a first symbol 808 and a second symbol 810. For example, the UE may configure the UL-centric subframe to include at least the data portion 804 and the common uplink portion 806, and may configure the common uplink portion 806 to include the first symbol 808 and the second symbol 810. The first symbol 808 may precede the second symbol 810. In some aspects, the first symbol 808 and the second symbol 810 may be configured to have a shorter symbol duration than one or more symbols included in another portion of the wireless communication structure, such as data portion 804. In some aspects, configuring the wireless communication structure may include at least defining a transmission unit in the time domain.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL centric subframes and DL centric subframes. In this example, the ratio of UL centric subframes to DL subframes in a frame may be dynamically adjusted based at least in part on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

As indicated above, FIG. 8 is provided merely as an example. Other examples are possible and may differ from what was described with regard to FIG. 8.

In 5G, a common uplink portion 706, 806 of a wireless communication structure (e.g., sometimes referred to herein as a subframe, but which may include a similar type of periodic time-bounded wireless communication structure) may be used by a UE (e.g., UE 120) to transmit, for example, a reference signal, such as a sounding reference signal (SRS), a demodulation reference signal (DMRS), and/or the like. Additionally, or alternatively, the common uplink portion 706, 806 may be used by the UE to transmit uplink payload, such as a physical uplink control channel (PUCCH) acknowledgment indication (e.g., an ACK or NACK), a PUCCH scheduling request (SR), a PUCCH buffer status report (BSR), a PUCCH channel state indication (CSI), a physical uplink shared channel (PUSCH) acknowledgment indication (e.g., an ACK or NACK), PUSCH data, and/or the like.

In some aspects, the UE may use the common uplink portion 706, 806 of a subframe to transmit an acknowledgement indication (e.g., an ACK or a NACK) in response to a communication received in a data portion of the same subframe (e.g., downlink data portion 704, described above in connection with FIG. 7). This acknowledgement indication may be referred to as an immediate acknowledgment indication (e.g., an immediate ACK or an immediate NACK) because the acknowledgement indication is transmitted in the same subframe in which the data that triggers the acknowledgement indication is received. For example, and referring to FIG. 7, the UE may receive downlink data during the data portion 704 of the subframe, and may transmit, during the common uplink portion 706 of the subframe, a positive or negative acknowledgement indication in response to a communication included in the downlink data. In other words, the UE may transmit the acknowledgement indication in a common uplink portion 706 that immediately follows the data portion 704 without any intervening common uplink portions 706.

Before transmitting an acknowledgement indication in response to a received communication, the UE may perform one or more operations, such as decoding the communication, performing a cyclic redundancy check, generating the acknowledgement indication, encoding the acknowledgement indication, and/or mapping the acknowledgement indication to a symbol for transmission. Because these operations take time, the UE may not be able to perform all of the operations in time to transmit the immediate acknowledgment indication in the first symbol of the common uplink portion 706 in the same subframe as the received communication.

To gain additional processing time for an immediate acknowledgement, the UE may transmit one or more reference signals (e.g., a DMRS, an SRS, and/or the like) using a first symbol of the common uplink portion 706, 806, and may transmit an uplink payload, such as an immediate acknowledgement indication, using a second symbol of the common uplink portion 706, 806. In some aspects, the UE may configure the common uplink portion 706, 806 to have a shorter symbol duration (e.g., $\frac{1}{28}$ millisecond or some other duration) than one or more other symbols (e.g., having a $\frac{1}{14}$ millisecond or some other duration) of the subframe, thereby gaining additional processing time during the first symbol of the common uplink portion 706, 806, so that the immediate acknowledgement indication may be transmitted in the second symbol of the common uplink portion 706, 806 without increasing the duration of the common uplink portion 706, 806. By transmitting the immediate acknowledgement indication, the UE reduces network latency and/or re-transmission time by enabling a base station to re-transmit negatively acknowledged communications more quickly and/or to receive positive acknowledgements more quickly. Additional details regarding configuring the common uplink portion of a subframe are described in more detail below.

Figure 9:
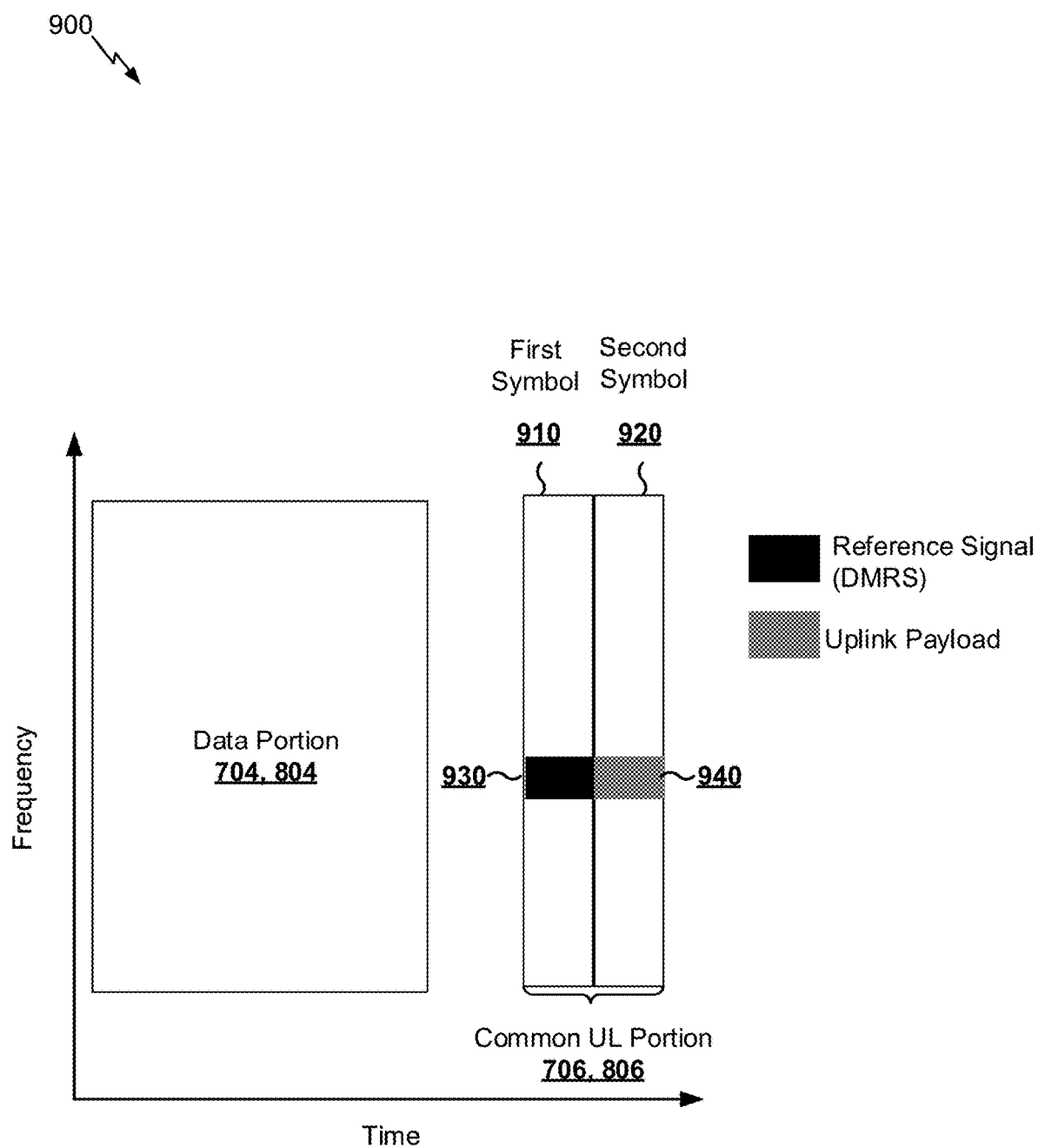

FIG. 9 is a diagram illustrating an example 900 of a technique for common uplink burst, in accordance with various aspects of the present disclosure.

As shown in FIG. 9, a UE (e.g., UE 120) may configure a wireless communication structure to include at least a data portion 704, 804 and a common uplink portion 706, 806. In some aspects, the UE may configure the wireless communication structure to include a control portion 702, 802, a data portion 704, 804, a guard period, and/or a common uplink portion 706, 806, as described above in connection with FIGS. 7 and 8. As shown, the UE may configure the common uplink portion 706, 806 to include a first symbol 910 and a second symbol 920, wherein the first symbol 910 precedes the second symbol 920 in the time domain.

The UE may map at least a portion of one or more reference signals 930 to at least one of the first symbol 910 or the second symbol 920, and may map at least a portion of an uplink payload 940 to at least one of the first symbol 910 or the second symbol 920. The one or more reference signals 930 may include, for example, a DMRS, an SRS, and/or the like. In some aspects, the uplink payload 940 may include an acknowledgement indication (e.g., a positive acknowledgement indication (ACK) or a negative acknowledgement indication (NACK)), such as a PUCCH acknowledgement indication, a PUSCH TCP acknowledgement indication, and/or the like. In some aspects, the acknowledgement indication may be an immediate acknowledgement indication to a communication included in downlink data received during a data portion 704. In some aspects, the uplink payload 940 may include information that is not based on a communication included in downlink data received during the data portion 704. For example, the uplink payload 940 may include a PUCCH scheduling request (SR), a PUCCH buffer status report (BSR), a PUCCH channel state indication (CSI), PUCCH data, PUSCH data, and/or the like.

For example, the UE may map a DMRS to the first symbol 910 of the common uplink portion 706, 806, and may map an immediate acknowledgement indication to the second symbol 920 of the common uplink portion 706, 806. In this way, the UE gains additional processing time in the first symbol 910 to perform operations associated with generating and transmitting the immediate acknowledgement indication, as compared to mapping the immediate acknowledgement to the first symbol 910 or configuring the common uplink portion 706, 806 to include a single symbol (e.g., having the same duration in time as one or more other symbols included in the subframe, such as in the control portion 702, 802 and/or the data portion 704, 804). Without this additional processing time, the UE may be unable to transmit the immediate acknowledgement indication in a same subframe as the downlink data corresponding to the immediate acknowledgement indication. By transmitting the immediate acknowledgement indication in a same wireless communication structure as the downlink data corresponding to the immediate acknowledgement indication, the UE reduces network latency and/or re-transmission time by enabling a base station to re-transmit negatively acknowledged communications more quickly and to receive positive acknowledgements more quickly.

In some aspects, the UE may configure the common uplink portion 706, 806 to have the same symbol duration as one or more other portions of the wireless communication structure (e.g., a control portion 702, 802, a data portion 704, 804, a guard period, and/or the like). In this way, the UE gains processing time to transmit an uplink payload while conserving processing resources that would otherwise be used to switch between different symbol durations for different portions of the wireless communication structure.

In some aspects, the UE may configure the common uplink portion 706, 806 to have a shorter symbol duration than one or more other symbols of the wireless communication structure (e.g., a shorter symbol duration than one or more symbols included in the control portion 702, 802, the data portion 704, 804, the guard period, and/or the like). In this way, the UE gains processing time to transmit an uplink payload without increasing the duration of the common uplink portion 706, 806, which conserves time resources for other portions of the subframe.

To achieve the shorter symbol duration for the common uplink portion 706, 806, the UE may configure the common uplink portion 706, 806 with a larger sub-carrier spacing than one or more other portions of the wireless communication structure. For example, the UE may configure the data portion 704, 804 with a sub-carrier spacing of 15 kHz, resulting in a symbol duration of $\frac{1}{14}$ milliseconds, and may configure the common uplink portion 706, 806 with a sub-carrier spacing of 30 kHz, resulting in a symbol duration of $\frac{1}{28}$ millisecond. In this way, the UE creates additional processing time (e.g., $\frac{1}{28}$ millisecond of the first symbol 910) for uplink payload data to be transmitted using the second symbol 920. In this manner, by configuring the common uplink portion 706, 806 with a sub-carrier spacing of 30 kHz rather than 15 kHz, the present methods may define two symbols rather than one symbol for a period of time (e.g., $\frac{1}{14}$ ms) of the common uplink portion 706, 806.

As indicated above, FIG. 9 is provided merely as an example. Other examples are possible and may differ from what was described with regard to FIG. 9.

Figures 10, 11:
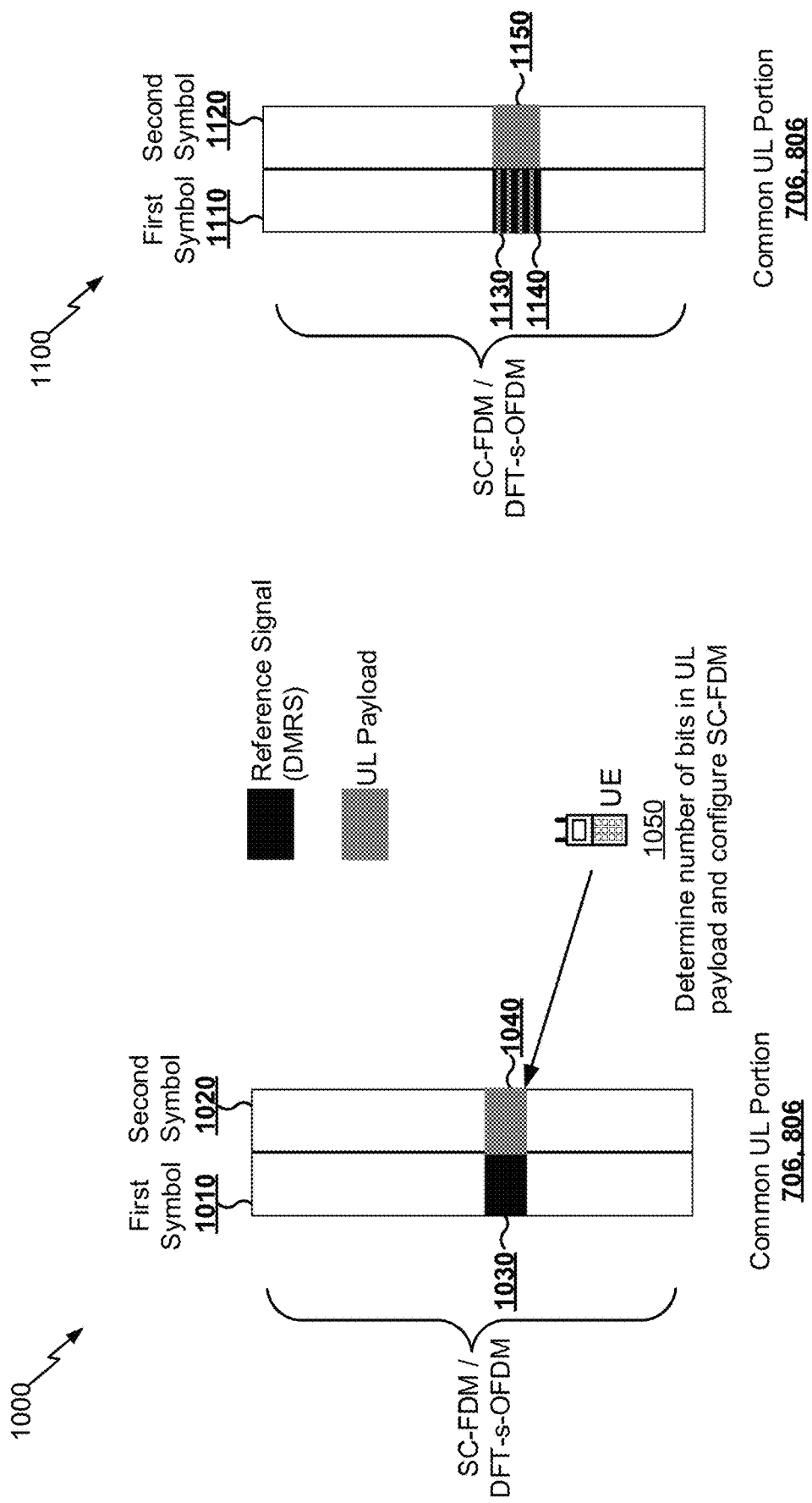

FIG. 10 is a diagram illustrating an example 1000 of a technique for common uplink burst, in accordance with various aspects of the present disclosure.

As shown in FIG. 10, in some aspects, a UE (e.g., UE 120) may configure the common uplink portion 706, 806 to use SC-FDM (e.g., sometimes referred to as DFT-s-OFDM in 5G) to transmit the one or more reference signals 1030 and the uplink payload 1040. For example, the UE may use SC-FDM to map the one or more reference signals 1030 and the uplink payload 1040 to the first symbol 1010 and the second symbol 1020 of the common uplink portion 706, 806. In the example shown in FIG. 10, an entirety of the one or more reference signals 1030 is mapped to the first symbol 1010, and an entirety of the uplink payload 1040 is mapped to the second symbol 1020.

For example, the one or more reference signals may include a DMRS, and the uplink payload may include an immediate acknowledgement indication (e.g., an immediate ACK or an immediate NACK). In this case, and as shown in FIG. 10, the UE may use SC-FDM to map an entirety of the DMRS to the first symbol 1010 and to map an entirety of the immediate acknowledgement indication to the second symbol 1020.

By using SC-FDM for symbol mapping, the UE may gain performance benefits associated with the relatively low peak-to-average power ratio (PAPR) of SC-FDM (e.g., as compared to OFDM, sometimes referred to as CP-OFDM in 5G). To keep DMRS overhead or other reference signal overhead low, the UE may configure the use of SC-FDM when the number of bits of the uplink payload 1040 is less than or equal to a threshold (e.g., is equal to 1 bit, is equal to 2 bits, is equal to 3 bits, is less than or equal to 2 bits, is less than or equal to 3 bits, is less than 4 bits, etc.). Thus, in some aspects, the UE may determine a number of bits included in the uplink payload 1040, and may configure the use of SC-FDM for symbol mapping based at least in part on a determination that the number of bits does not satisfy a threshold (e.g., is less than a threshold, is less than or equal to a threshold, etc.).

As shown by reference number 1050, the UE may selectively configure the use of SC-FDM or OFDM for symbol mapping based at least in part on the number of bits included in the uplink payload 1040. For example, when the number of bits does not satisfy a threshold, the UE may configure SC-FDM, as shown in FIGS. 10 and 11. When the number of bits satisfies the threshold (e.g., is greater than the threshold, is greater than or equal to the threshold, etc.), then the UE may configure OFDM, as described in more detail below in connection with FIGS. 12 and 13. In this way, the UE may balance competing performance requirements, such as PAPR and reference signal overhead.

As indicated above, FIG. 10 is provided merely as an example. Other examples are possible and may differ from what was described with regard to FIG. 10.

FIG. 11 is a diagram illustrating an example 1100 of a technique for common uplink burst, in accordance with various aspects of the present disclosure.

As shown in FIG. 11, when using SC-FDM to transmit one or more reference signals 1130 and an uplink payload, a UE (e.g., UE 120) may map the one or more reference signals 1130 and a first portion 1140 of the uplink payload to the first symbol 1110, and may map a second portion 1150 of the uplink payload to the second symbol 1120. In some aspects, and as shown, the UE may transmit the one or more reference signals 1130 and the first portion 1140 of the uplink payload using alternating sub-carriers (e.g., sometimes referred to as tones, frequencies, and/or frequency bands).

In some aspects, the UE may use this configuration based as least in part on comparing the number of bits of the uplink payload to a threshold. For example, if each symbol represents two bits of data, then the UE may use this configuration when the number of bits of the uplink payload is equal to three. In this case, one bit of the reference signal and one bit of the uplink payload may be mapped to the first symbol 1110, and the remaining two bits of the uplink payload may be mapped to the second symbol 1120. To map the reference signal and the uplink payload to the first symbol 1110 and still maintain the single-carrier waveform of SC-FDM, the UE may generate a sequence based at least in part on a value of the reference signal and/or a value of the first portion 1140 of the uplink payload, and may transmit the sequence in the first symbol 1110.

In some aspects, the UE may use the SC-FDM configuration shown in FIG. 10 when the number of bits of the uplink payload does not satisfy a first threshold (e.g., is less than or equal to 2 bits), and may use the SC-FDM configuration shown in FIG. 11 when the number of bits of the uplink payload satisfies the first threshold (e.g., is greater than 2 bits) but does not satisfy a second threshold (e.g., is less than or equal to 3 bits). In this way, the UE may select an efficient (e.g., the most efficient) SC-FDM configuration to balance the conservation of processing resources (e.g., by avoiding calculation of the sequence using the first portion of the payload when the number of bits of the uplink payload is less than or equal to 2) and the reduction of DMRS overhead (e.g., by using 1 bit instead of 2 bits for DMRS transmission when the uplink payload is 3 bits). Additionally, or alternatively, the UE may support code division multiplexing of multiple UEs.

As indicated above, FIG. 11 is provided merely as an example. Other examples are possible and may differ from what was described with regard to FIG. 11.

FIG. 12 is a diagram illustrating an example 1200 of a technique for common uplink burst, in accordance with various aspects of the present disclosure.

As shown in FIG. 12, in some aspects, a UE (e.g., UE 120) may configure the common uplink portion 706, 806 to use OFDM (e.g., sometimes referred to as CP-OFDM in 5G) to transmit the one or more reference signals and the uplink payload. For example, the UE may use OFDM to map the one or more reference signals 1230 and a first portion 1240 of the uplink payload to the first symbol 1210, and may map a second portion 1250 of the uplink payload to the second symbol 1220. In some aspects, and as shown, the UE may transmit the one or more reference signals 1230 and the first portion 1240 of the uplink payload using alternating sub-carriers (e.g., sometimes referred to as tones, frequencies, and/or frequency bands). Additionally, or alternatively, the UE may transmit the first symbol 1210 and the second symbol 1220 using a same frequency band, as shown.

As shown by reference number 1260, the UE may selectively configure the use of SC-FDM or OFDM for symbol mapping based at least in part on the number of bits included in the uplink payload (e.g., the first portion 1240 and the second portion 1250 of the uplink payload). For example, when the number of bits satisfies a threshold (e.g., is greater than the threshold, is greater than or equal to the threshold, etc.), then the UE may configure OFDM, as shown in FIGS. 12 and 13. When the number of bits does not satisfy a threshold (e.g., is less than a threshold, is less than or equal to the threshold, etc.), the UE may configure SC-FDM, as described above in connection with FIGS. 10 and 11. In this way, the UE may balance competing performance requirements, such as PAPR and reference signal overhead.

Although FIG. 12 shows the one or more reference signals 1230 and a first portion 1240 of the uplink payload mapped to the first symbol 1210, and a second portion 1250 of the uplink payload mapped to the second symbol 1220, in some aspects, the UE may map a first portion 1240 of the uplink payload to the first symbol 1210, and may map the one or more reference signals 1230 and a second portion 1250 of the uplink payload to the second symbol 1220. In other words, what is shown in FIG. 12 as being mapped to the first symbol 1210 may be mapped to the second symbol 1220, and what is shown in FIG. 12 as being mapped to the second symbol 1220 may be mapped to the first symbol 1210, in some aspects. Additionally, or alternatively, a first portion of the one or more reference signals and a first portion of the uplink payload may be mapped to the first symbol 1210, and a second portion of the one or more reference signals and a second portion of the uplink payload may be mapped to the second symbol 1220.

By using OFDM to transmit the one or more reference signals 1230 and the uplink payload, the UE may reduce DMRS overhead, and may be capable of transmitting a greater number of bits of uplink payload as compared to using SC-FDM. Furthermore, by using the same frequency band to transmit the first symbol 1210 and the second symbol 1220, the UE may further reduce DMRS overhead because the DMRS does not need to be transmitted twice (e.g., once for each of two different frequency bands).

As indicated above, FIG. 12 is provided merely as an example. Other examples are possible and may differ from what was described with regard to FIG. 12.

FIG. 13 is a diagram illustrating an example 1300 of a technique for common uplink burst, in accordance with various aspects of the present disclosure.

As shown in FIG. 13, when using OFDM to transmit one or more reference signals and an uplink payload, a UE (e.g., UE 120) may map a first portion 1330 of the one or more reference signals and a first portion 1340 of the uplink payload to the first symbol 1310, and may map a second portion 1350 of the one or more reference signals and a second portion 1360 of the uplink payload to the second symbol 1320. In some aspects, the UE may transmit the first symbol 1310 and the second symbol 1320 using different subcarriers or frequency bands, as shown. In some aspects, the UE may transmit the first symbol 1310 and the second symbol 1320 using the same subcarrier or frequency band.

By using OFDM to transmit the one or more reference signals and the uplink payload, the UE may reduce DMRS overhead, and may be capable of transmitting a greater number of bits of uplink payload as compared to using SC-FDM. Furthermore, by using different frequency bands to transmit the first symbol 1310 and the second symbol 1320, the UE may increase frequency diversity, thereby increasing a likelihood that at least one of the first symbol 1310 and/or the second symbol 1320 is successfully received if one of the frequencies is associated with poor network conditions (e.g., interference, congestion, etc.).

In some aspects, when the UE is configured to use OFDM (e.g., as shown in FIGS. 12 and 13) or SC-FDM with at least a portion of the uplink payload transmitted using the first symbol (e.g., as shown in FIG. 11), some of the uplink payload may be transmitted using the first symbol. For example, when the uplink payload is greater than three bits, then a fraction, such as half or nearly half (e.g., two bits out of four bits, two bits out of five bits, etc.) of the uplink payload may be transmitted using the first symbol. In this case, the UE may transmit one or more acknowledgment indications for a first set of code blocks using the first symbol, and may transmit one or more acknowledgement indications for a second set of code blocks using the second symbol. The UE may receive the first set of code blocks in the data portion 704 prior to receiving the second set of code blocks in the data portion 704. Additionally, or alternatively, the UE may decode the first set of code blocks prior to decoding the second set of code blocks. In this way, the UE may have sufficient time to process one or more first acknowledgement indications for transmission using the first symbol (e.g., because the first set of code blocks is received prior to the second set of code blocks), and may also have sufficient time to process one or more second acknowledgement indications for transmission using the second symbol (e.g., because the UE may use the processing time gained by waiting for the second symbol to transmit the second acknowledgement indication for the second set of code blocks).

In some aspects, the one or more first acknowledgement indications may include a first set of bits that positively or negatively acknowledge the first set of code blocks. Similarly, the one or more second acknowledgement indications may include a second set of bits that positively or negatively acknowledge the second set of code blocks. In some aspects, the UE may encode the first set of bits and map the first set of encoded bits to the first symbol before the second set of bits are encoded and mapped to the second symbol.

In some aspects, the UE may encode the second set of bits independently from the first set of bits, and may map the second set of independently encoded bits to the second symbol (e.g., after the first set of encoded bits have been mapped to the first symbol). By independently encoding the second set of bits for mapping and transmission on the second symbol, the UE conserves processing and memory resources of the UE that would otherwise be needed to jointly encode the first and second set of bits (e.g., to store the first set of bits in memory until the second set of bits are available to be decoded, to process the first set of bits twice, etc.). Similarly, the UE conserves processing and memory resources of a destination for the bits (e.g., a base station, another UE, etc.) that would otherwise be needed for decoding (e.g., to process and/or decode the first set of bits twice, to store duplicate bits, etc.).

In some aspects, the UE may jointly encode the first set of bits and the second set of bits, and may map the jointly encoded first and second sets of bits to the second symbol (e.g., after the first set of encoded bits have been mapped to the first symbol). By jointly encoding the first and second sets of bits for mapping and transmission on the second symbol, a destination device may be capable of decoding both the first and second set of bits even if the first set of encoded bits, transmitted using the first symbol, is not received or is received with an error.

In some aspects, the UE may independently encode or jointly encode different sets of bits corresponding to an immediate acknowledgement notification included in the uplink payload, as described above. Additionally, or alternatively, the UE may determine that the uplink payload does not include an immediate acknowledgement indication, and may jointly encode bits included in the uplink payload based at least in part on determining that the uplink payload does not include an immediate acknowledgement indication. In some aspects, the UE may map the jointly encoded bits to the first symbol and the second symbol. The UE may perform this joint encoding and mapping to both the first and second symbols because for an uplink payload other than an immediate acknowledgement, the uplink payload is not dependent on downlink data received in data portion 704 and is, therefore, available for transmission using the first symbol regardless of the downlink data received in data portion 704. By jointly encoding the uplink payload and mapping the jointly encoded uplink payload to both symbols, the UE may increase a likelihood that the uplink payload is successfully received and/or decoded.

As indicated above, FIG. 13 is provided merely as an example. Other examples are possible and may differ from what was described with regard to FIG. 13.

FIG. 14 is a diagram illustrating an example 1400 of a technique for common uplink burst, in accordance with various aspects of the present disclosure.

As shown in FIG. 14, in some aspects, the one or more reference signals may include an SRS 1430 and a DMRS 1440. A UE (e.g., UE 120) may use alternating sub-carriers (e.g., even or odd sub-carriers or tones) to map and/or transmit the SRS 1430. In some aspects, the UE may map the SRS 1430 to the first symbol 1410, as shown. Additionally, or alternatively, the UE may map the SRS 1430 to the second symbol 1420. In some aspects, the UE may be configured for a wideband transmission or a narrowband transmission of the SRS 1430.

In some aspects, the UE may be configured to transmit only the SRS 1430 during a symbol, without transmitting any other information during that symbol. In this case, the UE may transmit the SRS 1430 (e.g., in alternating sub-carriers) using SC-FDM. Additionally, or alternatively, a different UE may transmit information (e.g., an uplink payload, etc.) during the same symbol using SC-FDM or OFDM. In this case, a first UE may use first alternating sub-carriers (e.g., even or odd tones) to transmit the SRS 1430, and the second UE may use second alternating sub-carriers (e.g., odd tones if the first UE uses even tones, and even tones if the first UE uses odd tones) to transmit information (e.g., an uplink payload).

In some aspects, the UE may map the SRS 1430 and the DMRS 1440 to the first symbol 1410 using OFDM, and may map the uplink payload 1450 to the second symbol 1420 using OFDM. In some aspects, the SRS 1430 may be an SRS transmitted by the UE (e.g., the same UE that transmits the DMRS 1440 and/or the uplink payload 1450). In some aspects, the SRS 1430 may be an SRS transmitted by another UE (e.g., a different UE than the UE that transmits the DMRS 1440 and/or the uplink payload 1450). In this case, mapping the SRS 1430 may refer to reserving and/or blanking one or more sub-carriers of a symbol during which the SRS 1430 is to be transmitted, so as not to transmit a communication on those sub-carrier(s). In some aspects, the UE may receive (e.g., from a base station) an indication that an SRS is to be transmitted (e.g., by another UE) during the first symbol 1410 for a bandwidth allocated to the UE. In this way, SRS interference may be reduced.

In some aspects, the UE may receive, from the base station, an indicator (e.g., of one bit, of two bits, etc.) to notify the UE of whether any UEs (e.g., the UE and/or another UE) are scheduled to transmit an SRS 1430 in the same bandwidth as the bandwidth allocated to the UE (e.g., during the first symbol and/or the second symbol). If the indicator indicates that no SRSs 1430 are scheduled, then the UE may use any or every sub-carrier in the bandwidth allocated to the UE. If the indicator indicates that an SRS 1430 for another UE is scheduled, then the UE may use alternating sub-carriers that will not be occupied by the SRS 1430. In some aspects, the indicator may indicate which sub-carriers (e.g., even or odd tones) will be occupied by the SRS 1430. Additionally, or alternatively, the UE may use a default indication (e.g., indicating that SRS 1430 is to be transmitted on even tones) when the indicator from the UE does not indicate which sub-carriers will be occupied by the SRS 1430. If the SRS 1430 is an SRS of the UE (e.g., not from another UE), then the UE may map the DMRS 1440 and the uplink payload 1450 to the second symbol 1420. For example, the UE may move the DMRS 1440 and a first portion of the uplink payload 1450, previously mapped to the first symbol 1410, to the second symbol 1420, and may transmit the DMRS 1440, the first portion of the uplink payload 1450, and a second portion of the uplink payload 1450 (e.g., previously scheduled for transmission in the second symbol 1420) in the second symbol 1420.

In some aspects, in a similar manner as described above in connection with FIGS. 12 and 13, the UE may determine to use OFDM to map the SRS 1430 and the DMRS 1440 to the first symbol 1410 and to map the uplink payload 1450 to the second symbol 1420 based at least in part on a determination that a number of bits included in the uplink payload 1450 satisfies a threshold (e.g., is greater than 2 bits). In this way, the UE may reduce reference signal overhead.

Similarly, the UE may determine to use SC-FDM to map the SRS 1430 and the uplink payload 1450 to the first symbol based at least in part on a determination that a number of bits included in the uplink payload 1450 does not satisfy a threshold (e.g., is less than or equal to 2 bits). In some aspects, the UE may configure SC-FDM for mapping the SRS 1430 and the uplink payload 1450 in a similar manner as shown in FIGS. 10 and 11 in connection with the DMRS and the uplink payload. For example, the UE may map an entirety of the SRS 1430 to the first symbol 1410 and an entirety of the uplink payload 1450 to the second symbol 1420 using SC-FDM. As another example, the UE may map the SRS 1430 and a first portion of the uplink payload 1450 to the first symbol 1410, and may map a second portion of the uplink payload 1450 to the second symbol 1420 using SC-FDM. In this way, the UE may balance competing performance requirements, such as PAPR and reference signal overhead.

As indicated above, FIG. 14 is provided merely as an example. Other examples are possible and may differ from what was described with regard to FIG. 14.

FIG. 15 is a diagram illustrating an example 1500 of a technique for common uplink burst, in accordance with various aspects of the present disclosure.

As shown in FIG. 15, a UE (e.g., UE 120) may map an SRS 1530 to the first symbol 1510, and/or may map an SRS 1540 to the second symbol 1520. For example, the UE may map an SRS 1530 of the UE to the first symbol 1510 (e.g., in even sub-carriers), and may reserve one or more sub-carriers of the second symbol 1520 (e.g., in odd sub-carriers) for an SRS 1540 to be transmitted by a different UE in a bandwidth allocated to the UE. In this case, the UE may receive an indication of the SRS 1540 and/or an indication of the sub-carrier(s) in which the SRS 1540 is to be transmitted (e.g., in even or odd sub-carriers).

In some aspects, and as shown, the UE may map the SRS 1530 and the DMRS 1550 to the first symbol 1510 using OFDM, and may map the SRS 1540 and the uplink payload 1560 to the second symbol 1520 using OFDM. As further shown, the UE may transmit the DMRS 1550 using alternating sub-carriers not being using to transmit the SRS 1530 (e.g., an SRS transmitted by the UE or by another UE). As further shown, the UE may transmit the uplink payload 1560 using alternating sub-carriers not being using to transmit the SRS 1540 (e.g., an SRS transmitted by the UE or by another UE). For example, the UE may map the uplink payload 1560 to the second symbol 1520 using first alternating sub-carriers, and may map the SRS 1540 to second alternating sub-carriers of the second symbol 1520. In this way, the UE may efficiently utilize network resources while mitigating interference issues.

In some aspects, in a similar manner as described above in connection with FIGS. 12 and 13, the UE may determine to use OFDM to map the SRS 1530 and the DMRS 1550 to the first symbol 1510 and to map the SRS 1540 and the uplink payload 1560 to the second symbol 1520 based at least in part on a determination that a number of bits included in the uplink payload 1550 satisfies a threshold (e.g., is greater than 2 bits). In this way, the UE may reduce reference signal overhead.

As indicated above, FIG. 15 is provided merely as an example. Other examples are possible and may differ from what was described with regard to FIG. 15.

FIG. 16 is a diagram illustrating an example 1600 of a technique for common uplink burst, in accordance with various aspects of the present disclosure.

As shown in FIG. 16, in some aspects, a UE (e.g., UE 120) may map the SRS 1630 to the first symbol 1610 using SC-FDM, and may map the DMRS 1640 and the uplink payload 1650 to the second symbol 1620 using OFDM. As indicated elsewhere herein, the SRS 1630 may correspond to an SRS transmitted by the UE or an SRS transmitted by another UE. In some aspects, the UE may map the SRS 1630 to the first symbol 1610 using SC-FDM and may map the DMRS 1640 and the uplink payload 1650 to the second symbol 1620 using OFDM. This kind of mapping may apply to any size of uplink payload or may be based at least in part on a determination that a number of bits included in the uplink payload satisfies a threshold (e.g., is greater than 2 bits). In this way, the UE may reduce reference signal overhead. Furthermore, by preventing aggregation of the SRS 1630 with another signal (e.g., the DMRS 1640 and/or the uplink payload 1650) on the same symbol, the UE may conserve computing resources that would otherwise be consumed by using OFDM to aggregate the SRS 1630 and the other signal on the same symbol while potentially transmitting the SRS 1630 and the other signal using different transmit powers.

As indicated above, FIG. 16 is provided merely as an example. Other examples are possible and may differ from what was described with regard to FIG. 16.

Figure 17:
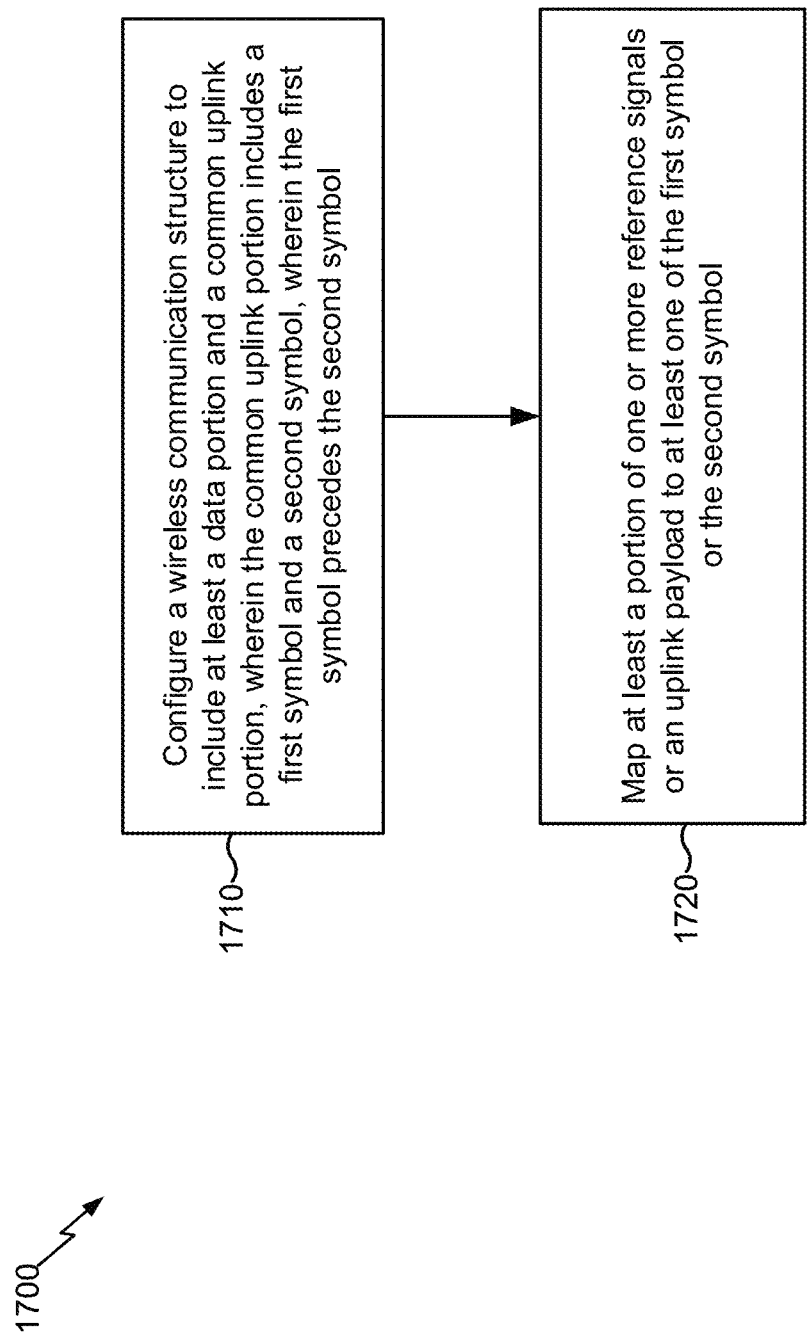
FIG. 17 is a diagram illustrating an example process performed, for example, by a wireless communication device, in accordance with various aspects of the present disclosure.

FIG. 17 is a diagram illustrating an example process 1700 performed, for example, by a wireless communication device, in accordance with various aspects of the present disclosure. Example process 1700 is an example where a wireless communication device (e.g., UE 120) performs one or more techniques for common uplink burst.

As shown in FIG. 17, in some aspects, process 1700 may include configuring a wireless communication structure to include at least a data portion and a common uplink portion, wherein the common uplink portion includes a first symbol and a second symbol, wherein the first symbol precedes the second symbol (block 1710). For example, a wireless communication device (e.g., UE 120) may configure a wireless communication structure to include at least a data portion and a common uplink portion, wherein the common uplink portion includes a first symbol and a second symbol, wherein the first symbol precedes the second symbol.

In some aspects, the first symbol and the second symbol are configured with a shorter symbol duration than one or more symbols included in the data portion. In some aspects, the common uplink portion is configured with a larger sub-carrier spacing than the data portion. In some aspects, the common uplink portion includes a common uplink short burst portion.

As shown in FIG. 17, in some aspects, process 1700 may include mapping at least a portion of one or more reference signals or an uplink payload to at least one of the first symbol or the second symbol (block 1720). For example, a wireless communication device (e.g., UE 120) may map at least a portion of one or more reference signals or an uplink payload to at least one of the first symbol or the second symbol.

In some aspects, the uplink payload includes a positive or negative acknowledgement indication (e.g., an ACK or NACK) to a communication included in downlink data received during the data portion. In some aspects, the uplink payload includes information that is not based on a communication included in downlink data received during the data portion. In some aspects, the uplink payload includes at least one of a PUCCH acknowledgment indication, a PUCCH scheduling request, a PUCCH buffer status report, a PUCCH channel state indication, a PUSCH acknowledgment indication, or PUSCH data.

In some aspects, the one or more reference signals includes a DMRS. In some aspects, the one or more reference signals includes an SRS. In some aspects, the one or more reference signals includes at least one of an SRS or a DMRS. For example, the SRS may be an SRS to be transmitted by the UE or another SRS to be transmitted by another UE. In this case, mapping the SRS may refer to reserving one or more sub-carriers of a symbol so as not to transmit a communication on those sub-carrier(s).

In some aspects, the wireless communication device is configured to use SC-FDM (e.g., sometimes referred to as DFT-s-OFDM) to transmit at least one of the one or more reference signals and/or the uplink payload. For example, the wireless communication device may be configured to use SC-FDM to transmit the one or more reference signals and the uplink payload. In some aspects, the wireless communication device is configured to use OFDM (e.g., sometimes referred to as CP-OFDM) to transmit at least one of the one or more reference signals and/or the uplink payload. In some aspects (e.g., when using SC-FDM), an entirety of the one or more reference signals is mapped to the first symbol, and an entirety of the uplink payload is mapped to the second symbol. In some aspects, the one or more reference signals is a DMRS, and the uplink payload includes a positive or negative acknowledgement indication to a downlink communication received in the data portion of the wireless communication structure (e.g., an immediate acknowledgement indication).

In some aspects, the wireless communication device determines a number of bits included in the uplink payload, and selectively configures the wireless communication device to use SC-FDM or OFDM for transmission of the one or more reference signals and the uplink payload in the common uplink portion of the wireless communication structure based at least in part on the number of bits included in the uplink payload. In some aspects, the wireless communication device configures the wireless communication device to use SC-FDM for transmission of the one or more reference signals and the uplink payload in the common uplink portion of the wireless communication structure based at least in part on a determination that the number of bits included in the uplink payload does not satisfy a threshold. In some aspects, the wireless communication device configures the wireless communication device to use OFDM for transmission of the one or more reference signals and the uplink payload in the common uplink portion of the wireless communication structure based at least in part on a determination that the number of bits included in the uplink payload satisfies a threshold.

In some aspects, the wireless communication device is configured to use SC-FDM to transmit the one or more reference signals and the uplink payload, wherein the one or more reference signals and a first portion of the uplink payload are mapped to the first symbol, and wherein a second portion of the uplink payload is mapped to the second symbol. In some aspects, a sequence corresponding to a value of the first portion of the uplink payload is transmitted in the first symbol. For example, a first sequence may correspond to a first value of the first portion of the uplink payload, and a second sequence may correspond to a second value of the first portion of the uplink payload.

In some aspects, the wireless communication device is configured to use OFDM to transmit the one or more reference signals and the uplink payload, wherein the one or more reference signals and a first portion of the uplink payload are mapped to the first symbol, wherein a second portion of the uplink payload is mapped to the second symbol, and wherein the first symbol and the second symbol are transmitted using a same frequency band.

In some aspects, the wireless communication device is configured to use OFDM to transmit the one or more reference signals and the uplink payload, wherein a first portion of the one or more reference signals and a first portion of the uplink payload are mapped to the first symbol, and wherein a second portion of the one or more reference signals and a second portion of the uplink payload are mapped to the second symbol. In some aspects, the first symbol and the second symbol are transmitted using different frequency bands.

In some aspects, the wireless communication device is configured to receive a first set of code blocks and a second set of code blocks during the data portion and decode the first set of code blocks before the second set of code blocks, wherein the uplink payload includes a first set of bits to positively or negatively acknowledge the first set of code blocks and a second set of bits to positively or negatively acknowledge the second set of code blocks, and wherein the first set of bits are encoded and mapped to the first symbol. In some aspects, the second set of bits are encoded independently from the first set of bits and mapped to the second symbol. In some aspects, the first set of bits and the second set of bits are jointly encoded and mapped to the second symbol. In some aspects, the uplink payload does not include an ACK or a NACK of downlink data received during the data portion of the same wireless communication structure, and the uplink payload is jointly encoded and mapped to the first symbol and the second symbol.

In some aspects, the one or more reference signals includes at least one of an SRS or a DMRS. In some aspects, the SRS is transmitted using alternating sub-carriers. In some aspects, the uplink payload is transmitted using alternating sub-carriers not being used to transmit the SRS or another SRS of another wireless communication device. In some aspects, the SRS and the uplink payload are mapped to the first symbol. In some aspects, the SRS of the wireless communication device or another SRS of another wireless communication device is mapped to the first symbol using single-carrier frequency-division multiplexing (SC-FDM), another DMRS and/or another uplink payload from another wireless communication device is mapped to the first symbol using SC-FDM or orthogonal frequency-division multiplexing (OFDM), and a transmission of the SRS or the other SRS and the transmission of the other DMRS and/or the other uplink payload use different subcarriers.

In some aspects, the DMRS and the SRS of the wireless communication device are mapped to the first symbol using OFDM and the uplink payload is mapped to the second symbol using OFDM based at least in part on a determination that a number of bits included in the uplink payload satisfies a threshold. In some aspects, the uplink payload is mapped to the second symbol using first alternating sub-carriers based at least in part on whether at least one of the SRS of the wireless communication device or the other SRS of the other wireless communication device is transmitted using second alternating sub-carriers during the second symbol.

In some aspects, the SRS is mapped to the first symbol using SC-FDM, and the DMRS and the uplink payload are mapped to the second symbol using OFDM. In some aspects, the SRS and the uplink payload are transmitted by the wireless communication device. In some aspects, the SRS is mapped to the first symbol using SC-FDM and the DMRS and the uplink payload are mapped to the second symbol using OFDM based at least in part on a determination that a number of bits included in the uplink payload satisfies a threshold.

In some aspects, the wireless communication device receives, from a base station, an indication of whether one or more SRS are to be transmitted during at least one of the first symbol or the second symbol for a bandwidth allocated to the wireless communication device, and the wireless communication device maps the one or more reference signals and the uplink payload based at least in part on receiving the indication. In some aspects, the indication indicates that no sounding reference signals are to be transmitted during at least one of the first symbol or the second symbol in the bandwidth allocated to the wireless communication device, and the one or more reference signals and the uplink payload are mapped to at least one of the first symbol or the second symbol using every sub-carrier in the bandwidth allocated to the wireless communication device based at least in part on the indication.

Although FIG. 17 shows example blocks of process 1700, in some aspects, process 1700 may include additional blocks, fewer blocks, different blocks, or differently arranged blocks than those depicted in FIG. 1700. Additionally, or alternatively, two or more of the blocks of process 1700 may be performed in parallel.

Figure 18:
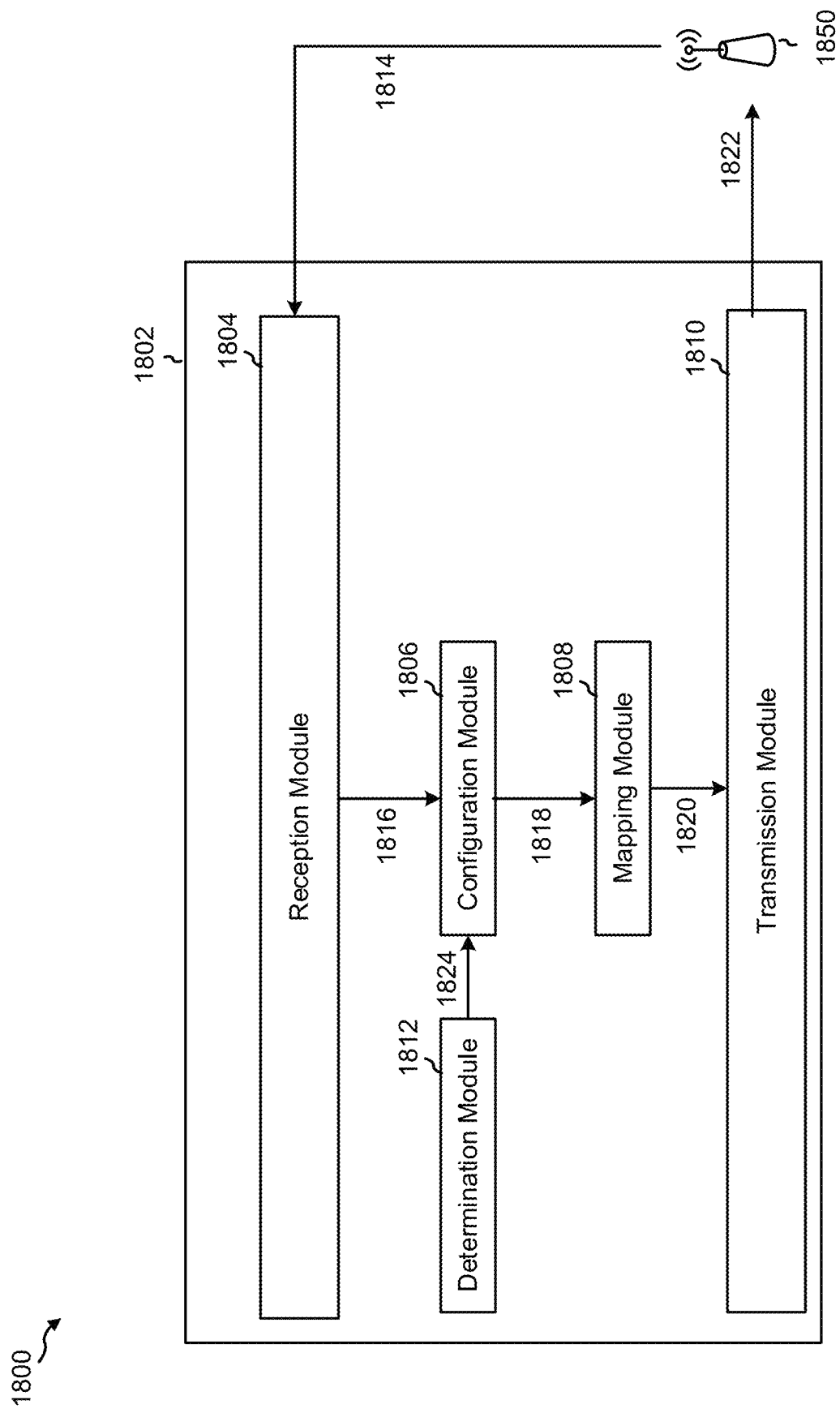
FIG. 18 is a conceptual data flow diagram illustrating the data flow between different modules/means/components in an example apparatus.

FIG. 18 is a conceptual data flow diagram 1800 illustrating the data flow between different modules/means/components in an example apparatus 1802. The apparatus 1802 may be a UE. In some aspects, the apparatus 1802 includes a reception module 1804, a configuration module 1806, a mapping module 1808, a transmission module 1810, and/or a determination module 1812.

In some aspects, the reception module 1804 may receive data 1814 from a base station 1850, such as information relating to a configuration of a wireless communication structure. The reception module 1804 may provide such information to the configuration module 1806 as data 1816. The configuration module 1806 may configure a wireless communication structure to include at least a data portion and a common uplink portion, wherein the common uplink portion includes a first symbol and a second symbol, and wherein the first symbol precedes the second symbol. In some aspects, the configuration module 1806 may provide information regarding the configuration to the mapping module 1808 as data 1818. The mapping module 1808 may map at least a portion of one or more reference signals or an uplink payload to at least one of the first symbol or the second symbol. In some aspects, the mapping module 1808 may provide the mapped information to the transmission module 1810 as data 1820. The transmission module 1810 may transmit the mapped information, in the appropriate symbol(s), to the base station 1850 as data 1822.

In some aspects, the determination module 1812 may determine a number of bits included in uplink payload, and may indicate the number of bits to the configuration module 1806 as data 1824. The configuration module 1806 may selectively configure SC-FDM or OFDM for transmission of information in the common uplink portion based at least in part on the number of bits included in the uplink payload. For example, the configuration module 1806 may configure the apparatus 1802 to use SC-FDM for transmission of information in the common uplink portion based at least in part on a determination that the number of bits included in the uplink payload does not satisfy a threshold. As another example, the configuration module 1806 may configure the apparatus 1802 to use OFDM for transmission of information in the common uplink portion based at least in part on a determination that the number of bits included in the uplink payload satisfies a threshold.

The apparatus may include additional modules that perform each of the blocks of the algorithm in the aforementioned flow chart of FIG. 17. As such, each block in the aforementioned flow chart of FIG. 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 17 are provided as an example. In practice, there may be additional modules, fewer modules, different modules, or differently arranged modules than those shown in FIG. 17. Furthermore, two or more modules shown in FIG. 17 may be implemented within a single module, or a single module shown in FIG. 17 may be implemented as multiple, distributed modules. Additionally, or alternatively, a set of modules (e.g., one or more modules) shown in FIG. 17 may perform one or more functions described as being performed by another set of modules shown in FIG. 17.

FIG. 18 is a diagram 1800 illustrating an example of a hardware implementation for an apparatus 1802' employing a processing system 1902. The apparatus 1802' may be a UE.

The processing system 1902 may be implemented with a bus architecture, represented generally by the bus 1904. The bus 1904 may include any number of interconnecting buses and bridges depending on the specific application of the processing system 1902 and the overall design constraints. The bus 1904 links together various circuits including one or more processors and/or hardware modules, represented by the processor 1906, the modules 1804, 1806, 1808, 1810, and/or 1812, and the computer-readable medium/memory 1908. The bus 1904 may also link various other circuits such as timing sources, peripherals, voltage regulators, and power management circuits, which are well known in the art, and therefore, will not be described any further.

The processing system 1902 may be coupled to a transceiver 1910. The transceiver 1910 is coupled to one or more antennas 1912. The transceiver 1910 provides a means for communicating with various other apparatus over a transmission medium. The transceiver 1910 receives a signal from the one or more antennas 1912, extracts information from the received signal, and provides the extracted information to the processing system 1902, specifically the reception module 1804. In addition, the transceiver 1910 receives information from the processing system 1902, specifically the transmission module 1810, and based at least in part on the received information, generates a signal to be applied to the one or more antennas 1912. The processing system 1902 includes a processor 1906 coupled to a computer-readable medium/memory 1908. The processor 1906 is responsible for general processing, including the execution of software stored on the computer-readable medium/memory 1908. The software, when executed by the processor 1906, causes the processing system 1902 to perform the various functions described supra for any particular apparatus. The computer-readable medium/memory 1908 may also be used for storing data that is manipulated by the processor 1906 when executing software. The processing system further includes at least one of the modules 1804, 1806, 1808, 1810, and/or 1812. The modules may be software modules running in the processor 1906, resident/stored in the computer readable medium/memory 1908, one or more hardware modules coupled to the processor 1906, or some combination thereof. The processing system 1902 may be a component of the UE 120 and may include the memory 282 and/or at least one of the TX MIMO processor 266, the RX processor 258, and/or the controller/processor 280.

In some aspects, the apparatus 1802/1802' for wireless communication includes means for configuring a wireless communication structure to include at least a data portion and a common uplink portion with a first symbol that precedes a second symbol, means for mapping at least a portion of one or more reference signals or an uplink payload to at least one of the first symbol or the second symbol, means for determining a number of bits included in uplink payload, means for configuring SC-FDM or OFDM for transmission of the one or more reference signals and the uplink payload in the common uplink portion of the wireless communication structure based at least in part on the number of bits included in the uplink payload, and/or the like. The aforementioned means may be one or more of the aforementioned modules of the apparatus 1802 and/or the processing system 1902 of the apparatus 1802' configured to perform the functions recited by the aforementioned means. As described supra, the processing system 1902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

Figure 19:
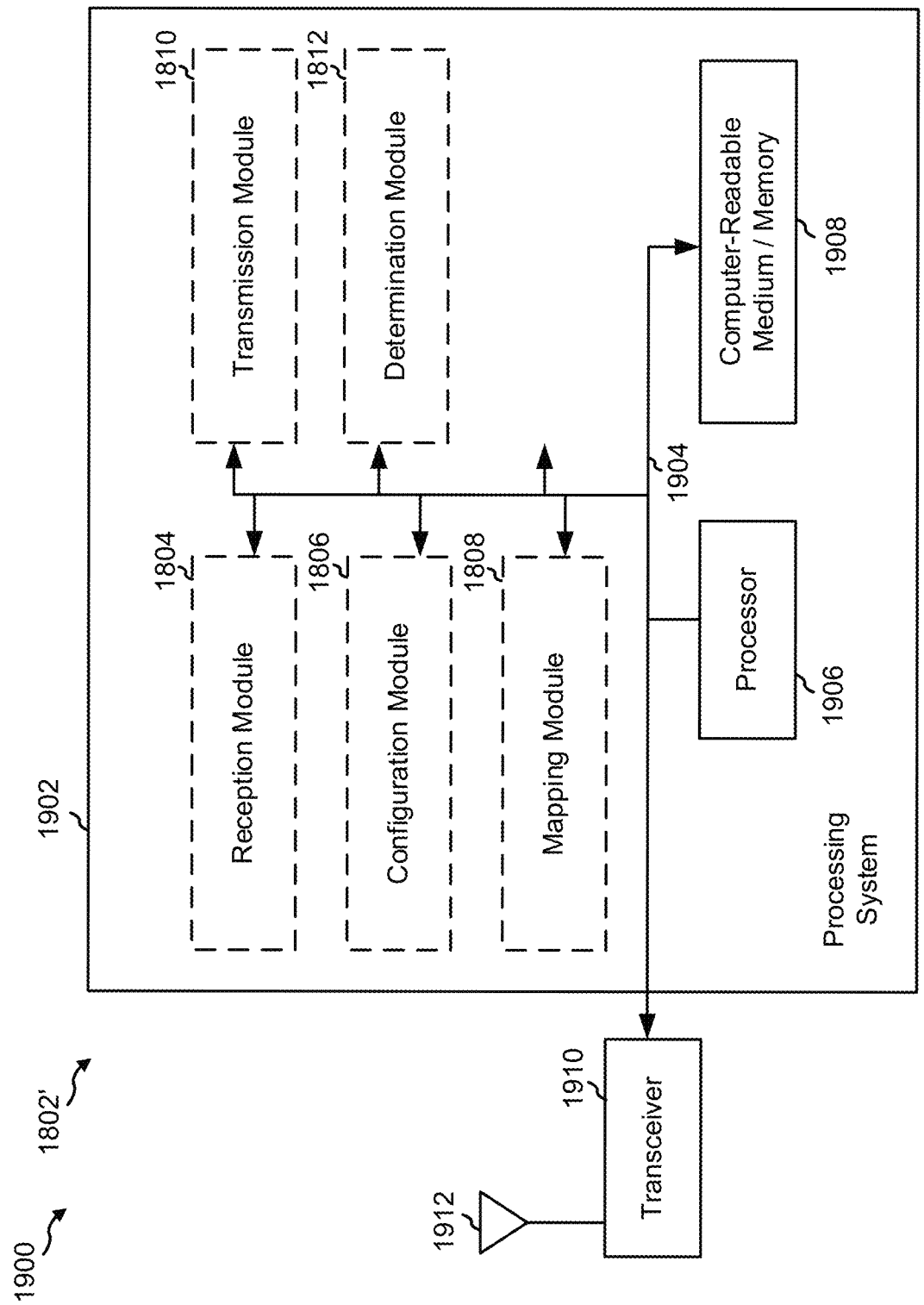
FIG. 19 is a diagram illustrating an example of a hardware implementation for an apparatus employing a processing system.

FIG. 19 is provided as an example. Other examples are possible and may differ from what was described in connection with FIG. 19.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. For example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
    configuring, by a wireless communication device, a wireless communication structure to include at least a data portion and a common uplink portion, wherein the common uplink portion includes a first symbol and a second symbol, and wherein the first symbol precedes the second symbol;
    mapping, by the wireless communication device, a first portion of one or more reference signals and a first portion of an uplink payload to the first symbol, and a second portion of the one or more reference signals and a second portion of the uplink payload to the second symbol; and
    transmitting the one or more reference signals and the uplink payload in the common uplink portion of the wireless communication structure, the transmitting including using cyclic prefix orthogonal frequency-division multiplexing (CP-OFDM) or discrete Fourier transform spread orthogonal frequency-division multiplexing (DFT-s-OFDM).

2. The method of claim 1, wherein the first symbol and the second symbol are configured with a shorter symbol duration than one or more symbols included in the data portion.

3. The method of claim 1, wherein the common uplink portion is configured with a larger sub-carrier spacing than the data portion.

4. The method of claim 1, wherein the uplink payload includes a positive or negative acknowledgement indication to a communication included in downlink data received during the data portion.

5. The method of claim 1, wherein the uplink payload includes information that is not based on a communication included in downlink data received during the data portion.

6. The method of claim 1, wherein the uplink payload includes at least one of a physical uplink control channel (PUCCH) acknowledgment indication, a PUCCH scheduling request, a PUCCH buffer status report, a PUCCH channel state indication, a physical uplink shared channel (PUSCH) acknowledgment indication, or PUSCH data.

7. The method of claim 1, wherein the one or more reference signals include a demodulation reference signal (DMRS).

8. The method of claim 1, wherein the one or more reference signals include a sounding reference signal (SRS).

9. The method of claim 1, wherein the one or more reference signals and the uplink payload are transmitted using different subcarriers.

10. The method of claim 9, wherein the different subcarriers comprise a pattern of subcarriers that alternate between one or more subcarriers of the one or more reference signals and one or more subcarriers of the uplink payload.

11. The method of claim 1, wherein the one or more reference signals include a demodulation reference signal (DMRS); and
    wherein the uplink payload includes a positive or negative acknowledgement indication to a downlink communication received in the data portion of the wireless communication structure.

12. The method of claim 1, wherein the uplink payload includes at least one of a physical uplink control channel (PUCCH) acknowledgment indication, a PUCCH scheduling request, a PUCCH buffer status report, a PUCCH channel state indication, a physical uplink shared channel (PUSCH) acknowledgment indication, or PUSCH data.

13. A wireless communication device, comprising:
    a memory; and
    one or more processors, operatively coupled to the memory, the one or more processors configured to:
    configure a wireless communication structure to include at least a data portion and a common uplink portion, wherein the common uplink portion includes a first symbol and a second symbol, and wherein the first symbol precedes the second symbol;
    map a first portion of one or more reference signals and a first portion of an uplink payload to the first symbol, and a second portion of the one or more reference signals and a second portion of the uplink payload to the second symbol; and
    transmit the one or more reference signals and the uplink payload in the common uplink portion of the wireless communication structure, the transmitting including using discrete Fourier transform spread orthogonal frequency-division multiplexing (DFT-s-OFDM).

14. The wireless communication device of claim 13, wherein the first symbol and the second symbol are configured with a shorter symbol duration than one or more symbols included in the data portion.

15. The wireless communication device of claim 13, wherein the common uplink portion is configured with a larger sub-carrier spacing than the data portion.

16. The wireless communication device of claim 13, wherein the uplink payload includes a positive or negative acknowledgement indication to a communication included in downlink data received during the data portion.

17. The wireless communication device of claim 13, wherein the uplink payload includes information that is not based on a communication included in downlink data received during the data portion.

18. The wireless communication device of claim 13, wherein the uplink payload includes at least one of a physical uplink control channel (PUCCH) acknowledgment indication, a PUCCH scheduling request, a PUCCH buffer status report, a PUCCH channel state indication, a physical uplink shared channel (PUSCH) acknowledgment indication, or PUSCH data.

19. The wireless communication device of claim 13, wherein the one or more reference signals include a demodulation reference signal (DMRS).

20. The wireless communication device of claim 13, wherein the one or more reference signals include a sounding reference signal (SRS).

21. The wireless communication device of claim 13, wherein the one or more reference signals and the uplink payload are transmitted using different subcarriers.

22. The wireless communication device of claim 21, wherein the different subcarriers comprise a pattern of subcarriers that alternate between one or more subcarriers of the one or more reference signals and one or more subcarriers of the uplink payload.

23. The wireless communication device of claim 13, wherein the one or more reference signals include a demodulation reference signal (DMRS); and
wherein the uplink payload includes a positive or negative acknowledgement indication to a downlink communication received in the data portion of the wireless communication structure.

24. The wireless communication device of claim 23, wherein the uplink payload includes at least one of a physical uplink control channel (PUCCH) acknowledgment indication, a PUCCH scheduling request, a PUCCH buffer status report, a PUCCH channel state indication, a physical uplink shared channel (PUSCH) acknowledgment indication, or PUSCH data.

25. A non-transitory computer-readable medium storing one or more instructions for wireless communication, the one or more instructions comprising:
one or more instructions that, when executed by one or more processors of a wireless communication device, cause the one or more processors to:
configure a wireless communication structure to include at least a data portion and a common uplink portion, wherein the common uplink portion includes a first symbol and a second symbol, and wherein the first symbol precedes the second symbol;
map a first portion of one or more reference signals and a first portion of an uplink payload to the first symbol, and a second portion of the one or more reference signals and a second portion of the uplink payload to the second symbol; and
transmit the one or more reference signals and the uplink payload in the common uplink portion of the wireless communication structure, the transmitting including using cyclic prefix orthogonal frequency-division multiplexing (CP-OFDM) or discrete Fourier transform spread orthogonal frequency-division multiplexing (DFT-s-OFDM).

26. The non-transitory computer-readable medium of claim 25, wherein the first symbol and the second symbol are configured with a shorter symbol duration than one or more symbols included in the data portion.

27. The non-transitory computer-readable medium of claim 25, wherein the uplink payload includes at least one of:
a positive or negative acknowledgement indication to a communication included in downlink data received during the data portion, information that is not based on a communication included in downlink data received during the data portion, or at least one of a physical uplink control channel (PUCCH) acknowledgment indication, a PUCCH scheduling request, a PUCCH buffer status report, a PUCCH channel state indication, a physical uplink shared channel (PUSCH) acknowledgment indication, or PUSCH data.

28. The non-transitory computer-readable medium of claim 25, wherein the one or more reference signals include at least one of:
a demodulation reference signal (DMRS), or a sounding reference signal (SRS).

29. The non-transitory computer-readable medium of claim 25, wherein the one or more reference signals and the uplink payload are transmitted using different subcarriers.

30. The non-transitory computer-readable medium of claim 25, wherein different subcarriers comprise a pattern of subcarriers that alternate between one or more subcarriers of the one or more reference signals and one or more subcarriers of the uplink payload.

31. An apparatus for wireless communication, comprising:
means for configuring a wireless communication structure to include at least a data portion and a common uplink portion, wherein the common uplink portion includes a first symbol and a second symbol, and wherein the first symbol precedes the second symbol;
means for mapping a first portion of one or more reference signals and a first portion of an uplink payload to the first symbol, and a second portion of the one or more reference signals and a second portion of the uplink payload to the second symbol; and
means for transmitting the one or more reference signals and the uplink payload in the common uplink portion of the wireless communication structure, the transmitting including using cyclic prefix orthogonal frequency-division multiplexing (CP-OFDM) or discrete Fourier transform spread orthogonal frequency-division multiplexing (DFT-s-OFDM).

32. The apparatus of claim 31, wherein the first symbol and the second symbol are configured with a shorter symbol duration than one or more symbols included in the data portion.

33. The apparatus of claim 31, wherein the uplink payload includes at least one of:
a positive or negative acknowledgement indication to a communication included in downlink data received during the data portion, information that is not based on a communication included in downlink data received during the data portion, or at least one of a physical uplink control channel (PUCCH) acknowledgment indication, a PUCCH scheduling request, a PUCCH buffer status report, a PUCCH channel state indication, a physical uplink shared channel (PUSCH) acknowledgment indication, or PUSCH data.

34. The apparatus of claim 31, wherein the one or more reference signals include at least one of:
a demodulation reference signal (DMRS), or a sounding reference signal (SRS).

35. The apparatus of claim 31, wherein the one or more reference signals and the uplink payload are transmitted using different subcarriers.

36. The apparatus of claim 35, wherein the different subcarriers comprise a pattern of subcarriers that alternate between one or more subcarriers of the one or more reference signals and one or more subcarriers of the uplink payload.

* * * * *